United States Patent
Nakamatsu et al.

(10) Patent No.: US 9,621,599 B2
(45) Date of Patent: Apr. 11, 2017

(54) COMMUNICATION SYSTEM, COMMUNICATION METHOD, AND CALL CONTROL SERVER

(71) Applicant: FUJITSU LIMITED, Kawasaki-shi, Kanagawa (JP)

(72) Inventors: Ryouji Nakamatsu, Fukuoka (JP); Hiromitsu Kajiyama, Fukuoka (JP); Shigehiko Hirata, Asakura (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/536,707

(22) Filed: Nov. 10, 2014

(65) Prior Publication Data

US 2015/0180909 A1 Jun. 25, 2015

(30) Foreign Application Priority Data

Dec. 24, 2013 (JP) ................................ 2013-266081

(51) Int. Cl.
- *H04L 1/00* (2006.01)
- *H04L 29/06* (2006.01)
- *H04L 29/08* (2006.01)

(52) U.S. Cl.
CPC ........ *H04L 65/1046* (2013.01); *H04L 67/101* (2013.01)

(58) Field of Classification Search
None
See application file for complete search history.

(56) References Cited

U.S. PATENT DOCUMENTS

| | | | |
|---|---|---|---|
| 6,744,878 B1 * | 6/2004 | Komissarchik | H04M 3/5232 379/265.03 |
| 6,977,899 B1 * | 12/2005 | Matragi | H04L 29/06027 370/230.1 |
| 8,903,453 B2 * | 12/2014 | Ogura | H04W 88/12 370/328 |
| 2002/0087694 A1 * | 7/2002 | Daoud | H04L 47/10 709/226 |
| 2003/0187982 A1 * | 10/2003 | Petit | H04L 63/08 709/225 |
| 2004/0103194 A1 * | 5/2004 | Islam | G06F 9/505 709/225 |

(Continued)

FOREIGN PATENT DOCUMENTS

| | | |
|---|---|---|
| JP | 2009-296186 | 12/2009 |
| JP | 2010-74310 | 4/2010 |

*Primary Examiner* — Bob Phunkulh
(74) *Attorney, Agent, or Firm* — Fujitsu Patent Center

(57) ABSTRACT

A first call control server transmits line information of a line to be used by a terminal device calls of which are controlled by the first call control server to a second call control server when congestion is detected. The first call control server receives the line information to be used in call control from the second call control server, and establishes a connection with the terminal device using the received line information. The second call control server receives the line information from the first call control server, and receives a call control request for the terminal device, the call control request being addressed to the first call control server. The second call control server responds to the first call control server with the received line information, when the call control request is received.

5 Claims, 19 Drawing Sheets

(56) References Cited

U.S. PATENT DOCUMENTS

| | | | |
|---|---|---|---|
| 2005/0068889 A1* | 3/2005 | Chavez | H04L 29/06027 370/225 |
| 2005/0102400 A1* | 5/2005 | Nakahara | H04L 29/06 709/225 |
| 2008/0052344 A1* | 2/2008 | Alecci | H04M 3/12 709/203 |
| 2008/0118043 A1* | 5/2008 | Kawaguchi | H04L 65/80 379/93.14 |
| 2009/0303875 A1 | 12/2009 | Matsumura | |
| 2009/0323530 A1* | 12/2009 | Trigui | H04L 41/5025 370/235 |
| 2011/0255410 A1* | 10/2011 | Yamen | H04L 12/5691 370/237 |
| 2012/0317224 A1* | 12/2012 | Caldwell | H04W 24/00 709/217 |
| 2013/0198393 A1* | 8/2013 | Etani | H04L 67/14 709/227 |
| 2014/0310390 A1* | 10/2014 | Sorenson, III | H04L 47/10 709/223 |
| 2014/0310391 A1* | 10/2014 | Sorenson, III | H04L 45/24 709/223 |
| 2015/0106422 A1* | 4/2015 | Svoboda | H04L 67/1004 709/202 |

* cited by examiner

| SERVER NUMBER | CALLED NUMBER | ADDRESS | CONGESTION STATUS | ALLOCATED SERVER NUMBER |
|---|---|---|---|---|
| 20 | 090000 | AAA | CONGESTED | 40 |
| | | | | 60 |
| 40 | 090111 | BBB | NORMAL | – |
| 60 | 090222 | CCC | NORMAL | – |
| 80 | 090333 | DDD | NORMAL | – |

FIG.6

| CALLED NUMBER | CIRCUIT | PEER LOCATION | DESTINATION |
|---|---|---|---|
| 090111 | STM1 | REGION 1 | DESTINATION ADDRESS A |
| 090222 | ATM1 | REGION 2 | DESTINATION ADDRESS B |
| 090333 | IP | REGION 3 | DESTINATION ADDRESS C |
| ⋮ | ⋮ | ⋮ | ⋮ |

| SERVER NUMBER | CALLED NUMBER | ADDRESS | CONGESTION STATUS | ALLOCATED SERVER NUMBER | CALL DISTRIBUTION RATIO |
|---|---|---|---|---|---|
| 20 | 090000 | AAA | CONGESTED | 40 | 1 |
| | | | | 60 | 2 |
| 40 | 090111 | BBB | NORMAL | — | — |
| 60 | 090222 | CCC | NORMAL | — | — |
| 80 | 090333 | DDD | NORMAL | — | — |

COMMUNICATION SYSTEM, COMMUNICATION METHOD, AND CALL CONTROL SERVER

CROSS-REFERENCE TO RELATED APPLICATION

This application is based upon and claims the benefit of priority of the prior Japanese Patent Application No. 2013-266081, filed on Dec. 24, 2013, the entire contents of which are incorporated herein by reference.

FIELD

The embodiments discussed herein are directed to a communication system, a communication method, and a call control server.

BACKGROUND

In a communication carrier network, communications to a particular regional network are managed by a particular station, and a call control server is responsible for executing tasks such as call control for the station. Because a call control server may become congested by processing load of incoming and outgoing calls to and from the terminals in the particular region managed by the call control server, congestion control using central processing unit (CPU) utilization is run on the call control server.

Specifically, the call control server monitors the CPU utilization at a constant cycle. If the CPU utilization exceeds a threshold N times in a row (where N is any natural number), the call control server considers that congestion has occurred, and incrementally suppresses the amount of call control handled by the call control server.

For example, when the average CPU utilization exceeds 75 percent, the call control server considers that moderate congestion has occurred, and suppresses 30 percent of the entire traffic. When the average CPU utilization exceeds 85 percent, the call control server heavy congestion has occurred, and suppresses 50 percent of the entire traffic. When the average CPU utilization exceeds 95 percent, the call control server considers that system congestion has occurred, and suppresses the entire traffic.

The call control server uses software control to reject the calls determined to be targets of suppression. Once the average CPU utilization drops below the threshold the traffic suppression is executed, the call control server releases the congestion control, and starts the call control again. Related-art examples are disclosed in Japanese Laid-open Patent Publication No. 2009-296186 and Japanese Laid-open Patent Publication No. 2010-74310.

With such a technology, however, congestion may prohibit establishment of calls even when some transmission line resources, i.e., some transmission circuit resources are available.

For example, when the call control server receives a large number of incoming calls and outgoing calls repeatedly in a short time period, after a disaster occurs, for example, the CPU becomes congested before the accepted calls are transitioned to the calling or busy status, for example. Because the CPU utilization is high, the call control server rejects acceptance of calls, despite transmission lines for establishing the calls might be available. Such available transmission line resources may therefore remain unused.

SUMMARY

According to an aspect of the embodiment, a communication system includes a first call control server; and a second call control server. The first call control server includes a transmitting unit that transmits line information related to a communication line to be used by a terminal device calls of which are controlled by the first call control server to the second call control server when congestion is detected; and a connecting unit that receives the line information to be used in call control from the second call control server, and establishes a connection with the terminal device using the received line information. The second call control server includes a first receiving unit that receives the line information from the first call control server; a second receiving unit that receives a call control request for the terminal device, the call control request being addressed to the first call control server; and a responding unit that responds the first call control server with the line information received by the first receiving unit, when the second receiving unit receives the call control request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a schematic of an example of information stored in a station data table;

DESCRIPTION OF EMBODIMENTS

Preferred embodiments will be explained with reference to accompanying drawings. These embodiments are not intended to limit the scope of the present invention in any way. These embodiments may also be combined as appropriate, within a scope that such a combination is not contradictory.

[a] First Embodiment

Overall Configuration

Figure 1:
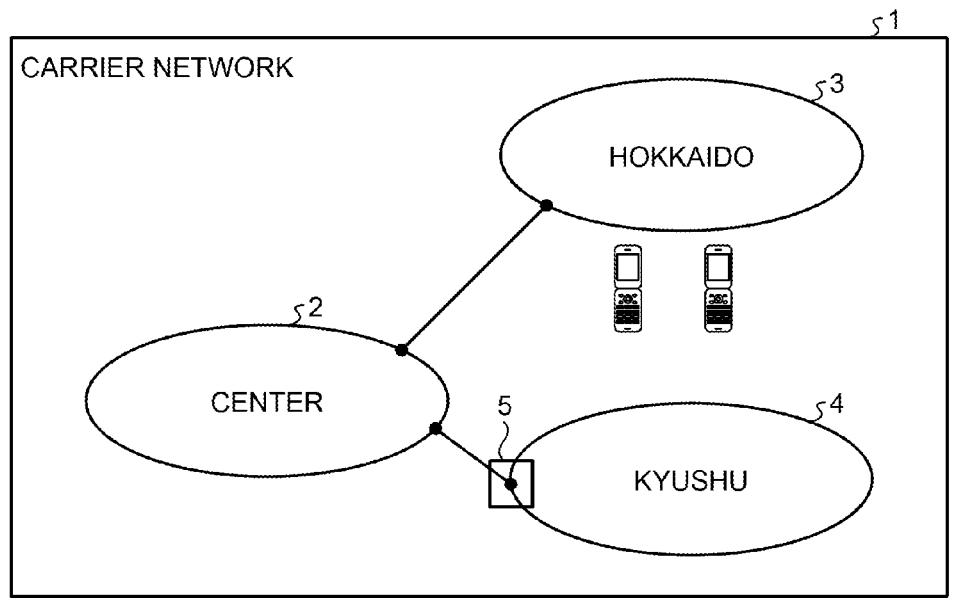
FIG. 1 is a schematic of an example of a carrier network according to a first embodiment of the present invention.

FIG. 1 is a schematic of an example of a carrier network according to a first embodiment of the present invention. As illustrated in FIG. 1, in this carrier network 1, a region of a center 2 is connected to a region of Hokkaido 3, and to a region of Kyusyu 4. The number and the type of the regions are merely exemplary and are not limited to those illustrated in FIG. 1.

Figure 2:
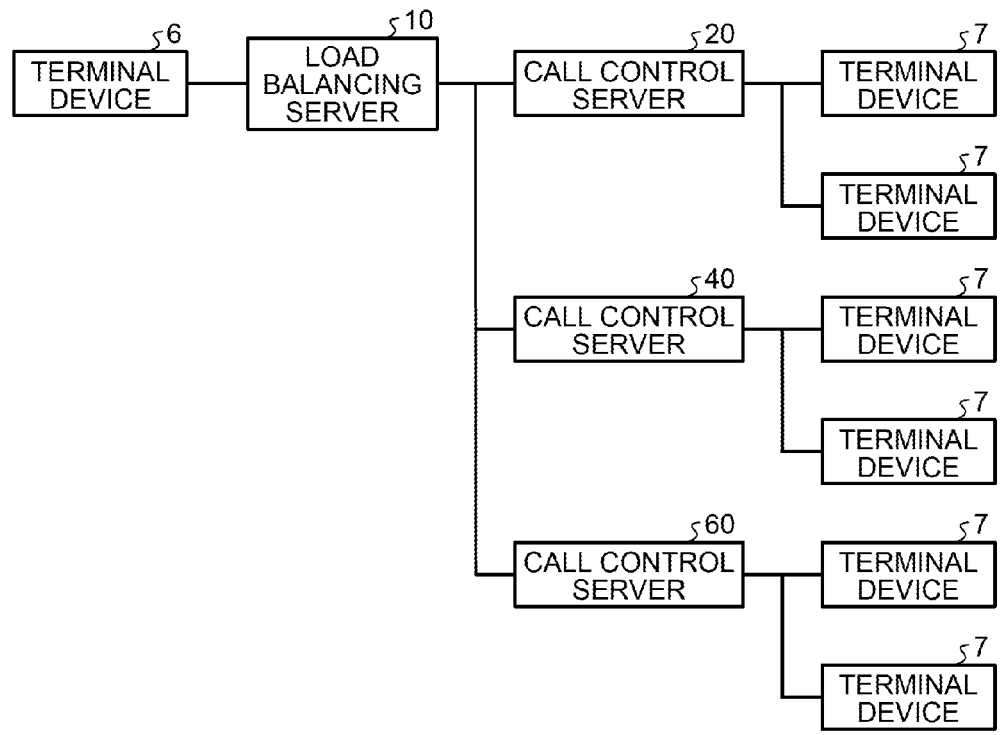
FIG. 2 is a schematic of an example of a communication system according to the first embodiment.

Deployed in each of these regions is a communication system 5 that controls Session Initiation Protocol (SIP) connections between the terminals. FIG. 2 is a schematic of an example of the communication system according to the first embodiment. As illustrated in FIG. 2, the communication system 5 includes a terminal device 6, a load balancing server 10, a call control server 20, a call control server 40, a call control server 60, and a plurality of terminal devices 7.

The terminal device 6 is a caller terminal requesting a SIP connection from the terminal device 7, and is a terminal such as a mobile telephone, a smartphone, or a personal computer. The load balancing server 10 is a server that distributes a SIP connection request from the terminal device 6 to the call control server that is responsible for managing the called terminal.

The call control server 20, the call control server 40, the call control server 60 are servers that establish a path between the terminal device 6 and the terminal device 7 over SIP, and control voice communications and the like. Each of the terminal devices 7 is a called terminal responding to a SIP connection from the terminal device 6, and is a terminal such as a mobile telephone, a smartphone, and a personal computer.

In the communication system 5 having such a configuration, a call control server not congested performs the C-PLANE control, on behalf of a congested call control server, using the station data of the congested call control server, and the congested call control server performs the U-PLANE control using the result of the C-PLANE control to establish a path. In this manner, transmission line resources can be used effectively.

In the first embodiment, as an example, the call control server 20 is explained to be a congested call control server that becomes congested, and the call control server 40 and the call control server 60 are explained to be not-congested call control servers that are not congested.

Device Configurations

Functional configurations of the devices included in the communication system 5 will now be explained. Because the terminal devices have the same configuration as a general mobile telephone, smartphone, or personal computer, a detailed explanation thereof is omitted herein. Each of the call control servers is provided with functions executed by a congested call control server and those executed by a not-congested call control server, but these functions are explained separately, for the clarity of the explanation.

Functional Configuration of Load Balancing Server

Figures 3, 4:
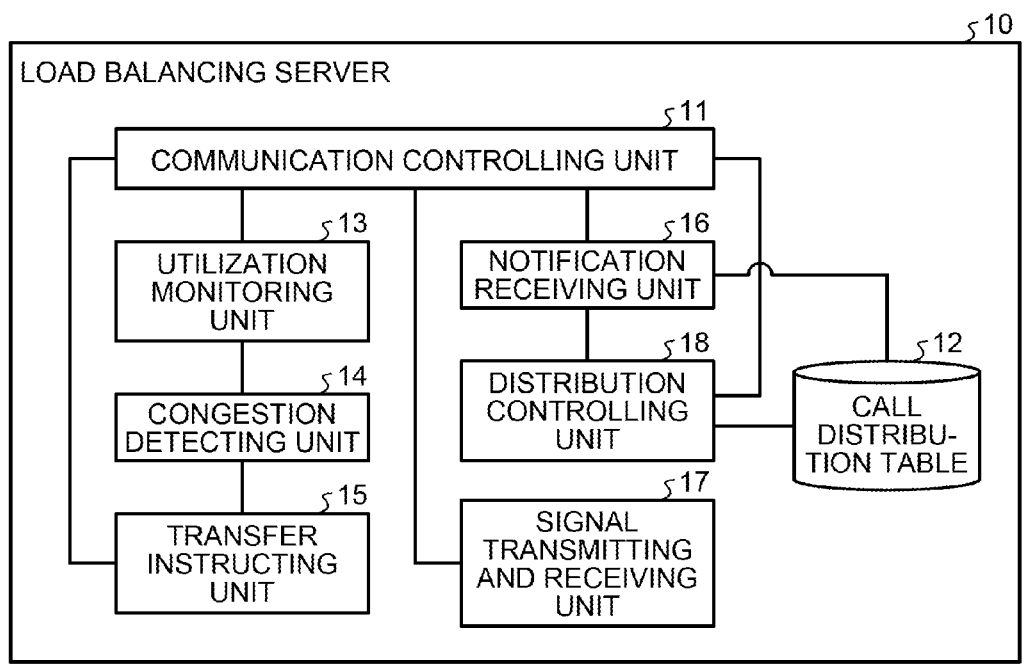
FIG. 3 is a functional block diagram illustrating a functional configuration of a load balancing server according to the first embodiment.
FIG. 4 is a schematic of an example of information stored in a call distribution table.

FIG. 3 is a functional block diagram illustrating a functional configuration of the load balancing server according to the first embodiment. As illustrated in FIG. 3, the load balancing server 10 includes a communication controlling unit 11, a call distribution table 12, a utilization monitoring unit 13, a congestion detecting unit 14, a transfer instructing unit 15, a notification receiving unit 16, a distribution controlling unit 18, and a signal transmitting and receiving unit 17. These processing units are implemented as a process executed by a processor or the like, or as an electrical circuit in the processor.

The communication controlling unit 11 is a processing unit that controls communications with another device, and an example of which is a network interface card. For example, the communication controlling unit 11 receives a SIP signal such as a SIP connection request from the terminal device 6, and forwards the SIP signal to the responsible call control server. The communication controlling unit 11 also receives various notifications and the like from the call control servers or the called terminal devices 7.

The call distribution table 12 is a table storing therein to which call control servers the signals are to be offloaded when congestion occurs. The call distribution table 12 is stored in a memory or a hard disk, for example. FIG. 4 is a schematic of an example of information stored in the call distribution table.

As illustrated in FIG. 4, the call distribution table 12 stores therein "server number, called number, address, congestion status, and allocated server number" in an associated manner. The "server number" stored in the call distribution table 12 is an identifier for identifying one of the call control servers. The "called number" is the number of a destination from which a SIP connection is requested, and is a called number of the terminal device 7. The "address" is an Internet Protocol (IP) address of the call control server.

The "congestion status" is a piece of information indicating the status of the call control server, and is specified with "congested" when the call control server is congested, and specified with "normal" when the call control server is not congested, for example. The "allocated server number" is a piece of information indicating the server number of a call control server that is specified as a server to which signals are offloaded when congestion occurs. The "allocated server number" may be set in advance by an administrator, for example, or may be dynamically set based on the load on these call control servers. For example, the load balancing server 10 may monitor the CPU load of the call control servers on the regular basis, and assign the allocated server based on the priorities that are assigned from those with the lower load.

The example illustrated in FIG. 4 indicates that the call control server 20 that is responsible for controlling the called number "090000" has an IP address of "AAA", that the call control server 20 is currently "congested", and that the call control server 40 and the call control server 60 are specified as the servers to which signals are offloaded.

The utilization monitoring unit 13 is a processing unit that monitors the load of the call control servers. Specifically, the utilization monitoring unit 13 regularly acquires CPU utilization, memory utilization, disk utilization, or the like from each of the call control servers. The utilization monitoring unit 13 then outputs the acquired information to the congestion detecting unit 14.

The congestion detecting unit 14 is a processing unit that detects congestion on a call control server. For example, the congestion detecting unit 14 detects a call control server the average CPU utilization of which exceeds a threshold, the CPU utilization being acquired by N times by the utilization monitoring unit 13, as a congested call control server. When congestion is detected, the congestion detecting unit 14 updates the congestion status of the call control server in the call distribution table 12 to the "congested".

As another example, the congestion detecting unit 14 may detect a call control server the CPU utilization of which exceeds a threshold N times in a row as a congested call control server. The congestion detecting unit 14 then identifies the server number of the call control server on which congestion is detected from the call distribution table 12, and outputs the server number to the transfer instructing unit 15.

The transfer instructing unit 15 is a processing unit that instructs a call control server on which congestion is detected to transfer the station data. For example, when the transfer instructing unit 15 receives a notification of "server number=20" from the congestion detecting unit 14, the transfer instructing unit 15 identifies the IP address "AAA" of the corresponding call control server 20 from the call distribution table 12. The transfer instructing unit 15 then transmits an instruction to transfer the station data to the IP address "AAA".

The transfer instructing unit 15 also identifies "allocated server number=40, 60" associated with the "server number=20" notified from the congestion detecting unit 14. The transfer instructing unit 15 then identifies the IP address "BBB" associated with the "allocated server number=40" and the IP address "CCC" associated with the "allocated server number=60". The transfer instructing unit 15 may transmit the IP addresses "BBB" and "CCC" of the servers to which signals are offloaded along with the instruction to transfer the station data.

The notification receiving unit 16 is a processing unit that receives various notifications from the call control servers. For example, the notification receiving unit 16 receives a notification of the completion in response to an instruction to transfer the station data, and a notification of the completion in response to an instruction to delete transferred station data, via the communication controlling unit 11.

The signal transmitting and receiving unit 17 is a processing unit that receives SIP signals such as a SIP connection request from the terminal device 6. For example, the signal transmitting and receiving unit 17 receives a SIP INVITE signal from the terminal device 6, and outputs the INVITE signal to the distribution controlling unit 18.

The distribution controlling unit 18 is a processing unit that forwards a SIP signal to a corresponding call control server. Specifically, the distribution controlling unit 18 identifies a corresponding call control server by referring to the call distribution table 12, and forwards the SIP signal to the identified call control server.

For example, the distribution controlling unit 18 extracts a called number "090000" corresponding to the destination from a SIP INVITE signal. The distribution controlling unit 18 then identifies the server number "20" and the address "AAA" associated with the called number "090000" in the call distribution table 12.

If the congestion status associate with the combination of the server number "20" and the address "AAA" is "normal", the distribution controlling unit 18 transmits the SIP INVITE signal to the address "AAA".

If the congestion status associated with the combination of the server number "20" and the address "AAA" is "congested", the distribution controlling unit 18 identifies the allocated server numbers "40" and "60" associated with the combination. The distribution controlling unit 18 then identifies the address of one of the allocated server numbers "40" and "60", and transmits the SIP INVITE signal to the identified address.

The distribution controlling unit 18 may determine any one of the servers with allocated server numbers "40" and "60" as a server to which a signal is offloaded. The distribution controlling unit 18 may also determine one of the allocated server numbers "40" and "60" the CPU utilization of which is lower as a server to which the signals is offloaded, or may also forward SIP signals alternatingly.

Functional Configuration of Congested Call Control Server

Figure 5:
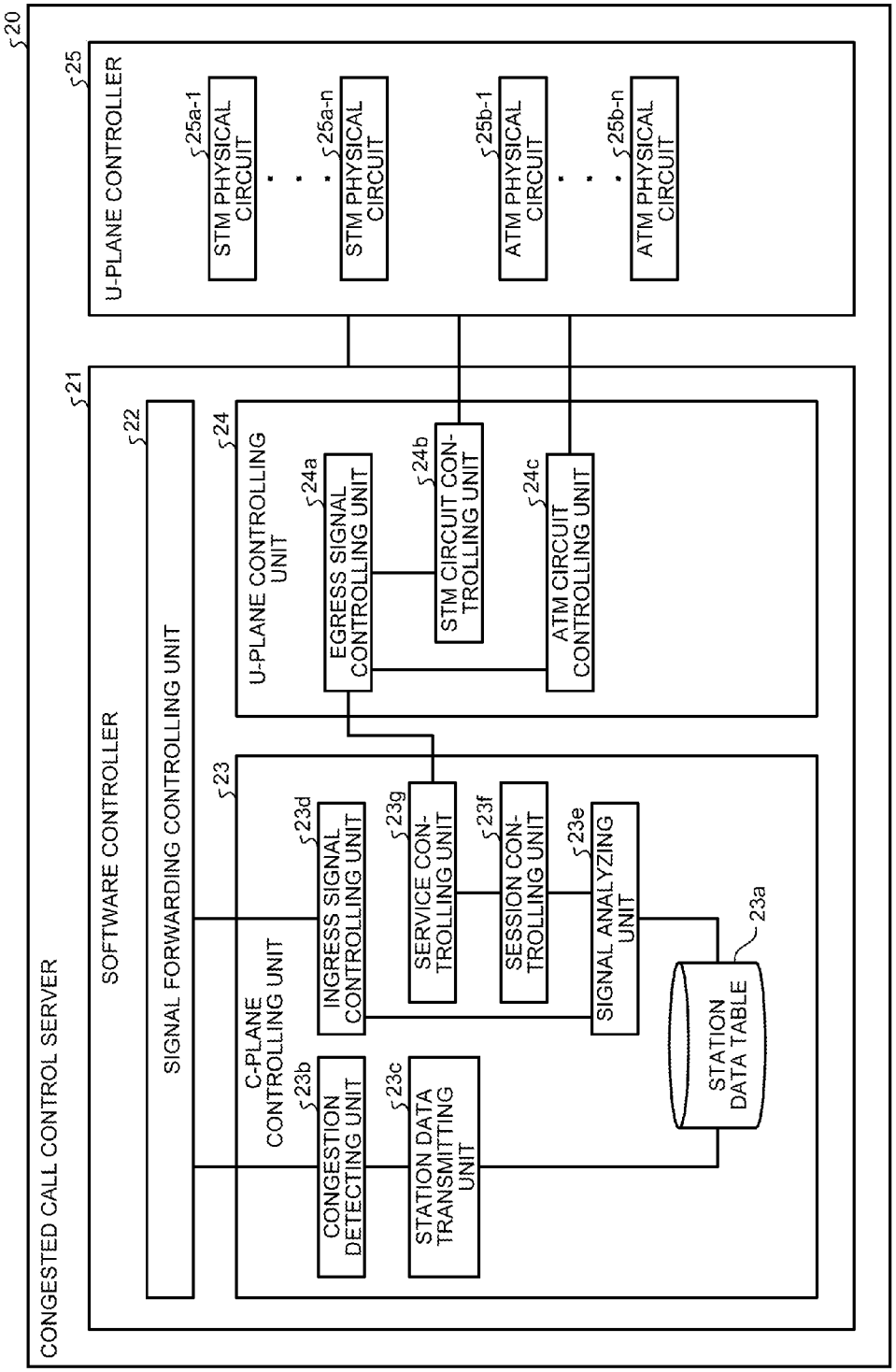
FIG. 5 is a functional block diagram illustrating a functional configuration of a congested call control server according to the first embodiment.

FIG. 5 is a functional block diagram illustrating a functional configuration of a congested call control server according to the first embodiment. As illustrated in FIG. 5, the congested call control server 20 includes a software controller 21 and a U-PLANE controller 25. The software controller 21 and the U-PLANE controller 25 are implemented as a process executed by a processor or the like, or as an electrical circuit in the processor.

The software controller 21 includes a signal forwarding controlling unit 22, a C-PLANE controlling unit 23, and a U-PLANE controlling unit 24, and is a processing unit that causes these units to perform C-PLANE control and U-PLANE control of a SIP signal.

The signal forwarding controlling unit 22 is a processing unit that distributes calls to the corresponding controlling unit. Specifically, the signal forwarding controlling unit 22 determines the type of a received SIP signal or notification of another type, and forwards the signal or the like to a controlling unit that processes the signal or the like.

For example, when an instruction to transfer station data is received from the load balancing server 10, the signal forwarding controlling unit 22 outputs the instruction to a congestion detecting unit 23*b*. When a SIP signal, C-PLANE information, or the like is received from the load balancing server 10, the signal forwarding controlling unit 22 outputs the signal or the like to an ingress signal controlling unit 23*d*.

The C-PLANE controlling unit 23 is a processing unit that executes various processes related to a protocol stack or C-PLANE responsible for the control. The C-PLANE controlling unit 23 includes a station data table 23*a*, the congestion detecting unit 23*b*, a station data transmitting unit 23*c*, the ingress signal controlling unit 23*d*, a signal analyzing unit 23*e*, a session controlling unit 23*f*, and a service controlling unit 23*g*. The C-PLANE controlling unit 23 may generate the ingress signal controlling unit 23d, the signal analyzing unit 23e, the session controlling unit 23f, and the service controlling unit 23g on a call-by-call basis.

The station data table 23a is a table storing therein station data indicating information of terminal devices located in a particular region managed by the congested call control server 20. The station data table 23a is stored in the memory or the hard disk, for example. FIG. 6 is a schematic of an example of information stored in the station data table. As illustrated in FIG. 6, the station data table 23a stores therein "called telephone number, line, peer location, and destination" in an associated manner.

The "called telephone number" stored in the station data table 23a is a telephone number that identifies a called terminal device 7. The "line" is a piece of information indicating the type of a line used by the terminal device 7, and specified as "STM" when the line is a synchronous transfer mode (STM) line and as "ATM" when the line is an asynchronous transfer mode (ATM) line. The "peer location" is a piece of information indicating the region where the terminal device 7 is located. The "destination" is the IP address of the terminal device 7.

The example illustrated in FIG. 6 indicates that the terminal device 7 that is located in a region 1 and having the called telephone number "090111" and the destination address A establishes a path over STM.

The congestion detecting unit 23b is a processing unit that detects congestion. Specifically, the congestion detecting unit 23b regularly transmits load information such as CPU utilization to the load balancing server 10. When a notification of congestion is received from the load balancing server 10, the congestion detecting unit 23b detects that the call control server is congested.

The congestion detecting unit 23b notifies the station data transmitting unit 23c of a detection of congestion. When a notification of a server to which signals are offloaded is received together with the notification of congestion detection, the congestion detecting unit 23b also notifies the station data transmitting unit 23c of the server to which signals are offloaded. Congestion may be detected by the congestion detecting unit 23b itself, using the same technique as that used by the load balancing server 10.

The station data transmitting unit 23c is a processing unit that transmits station data to another call control server. Specifically, when congestion is detected by the congestion detecting unit 23b, and an instruction to transmit station data is received from the load balancing server 10, the station data transmitting unit 23c transmits the station data stored in the station data table 23a to another call control server.

For example, the station data transmitting unit 23c transmits the station data to a call control server instructed by the load balancing server 10. The station data transmitting unit 23c may also transmit the station data to a call control server designated as a server to which signals are offloaded by an administrator in advance, or to the nearest call control server on the network. In such a case, the station data transmitting unit 23c transmits the address and the like of the call control server that is the destination to which the station data is transmitted, together with the notification of the completion of the station data transmission, to the load balancing server 10.

The ingress signal controlling unit 23d is a processing unit that executes protocol control. Specifically, when a SIP signal or C-PLANE information is received from the load balancing server 10, the ingress signal controlling unit 23d executes a receiving process, and transmits a reception acknowledgement, or outputs the signal to a corresponding processing unit. For example, the ingress signal controlling unit 23d outputs a received SIP signal or C-PLANE information to the signal analyzing unit 23e.

The signal analyzing unit 23e is a processing unit that analyzes a received signal, and executes a process corresponding to the analysis result. For example, when a SIP INVITE signal is received from the ingress signal controlling unit 23d, the signal analyzing unit 23e extracts a called telephone number "090111" from the INVITE signal. The signal analyzing unit 23e then refers to the station data table 23a, and identifies the "destination address A" as associated with "090111", and "STM" as the line used by the destination. The signal analyzing unit 23e then outputs the identified destination and the line information to the session controlling unit 23f.

When C-PLANE information is received from the ingress signal controlling unit 23d, the signal analyzing unit 23e identifies the "destination address A" as the destination, and "STM" as the line used by the destination based on the C-PLANE information. The signal analyzing unit 23e then outputs the identified destination and the line information to the session controlling unit 23f.

The session controlling unit 23f is a processing unit that assigns a received signal to a service controlling unit providing a service to the received signal. For example, when the destination "destination address A" and the used line "STM" are received from the signal analyzing unit 23e, the session controlling unit 23f outputs the destination "destination address A" and the used line "STM" to a service controlling unit that provides a service with an STM line.

The service controlling unit 23g is a processing unit that executes a corresponding service to a received signal. The service controlling unit 23g may be provided to each type of services. For example, when the destination "destination address A" and the used line "STM" are received from the session controlling unit 23f, the service controlling unit 23g outputs an instruction to establish a path with the "destination address A" over "STM" to the U-PLANE controlling unit 24.

The U-PLANE controlling unit 24 is a processing unit that performs various processes related to the U-PLANE in which user data is handled. The U-PLANE controlling unit 24 includes an egress signal controlling unit 24a, an STM line controlling unit 24b, and an ATM line controlling unit 24c.

The egress signal controlling unit 24a is a processing unit that instructs a controlling unit corresponding to the requested line type to establish a path, and is a processing unit that transmits an Integrated Services Digital Network User Part (ISUP) signal to the called terminal after the U-PLANE path is established.

For example, when an instruction to establish a path to the "destination address A" over "STM" is received from the service controlling unit 23g, the egress signal controlling unit 24a requests establishment of the path over STM from the STM line controlling unit 24b. Once the path is established over STM, the egress signal controlling unit 24a transmits an ISUP Initial Address Message (ISUP_IAM) signal or a B-ISDN User Part Initial Address Message (BISUP_IAM) signal including the telephone numbers of the caller party and the called party to the called "destination address A", via the signal forwarding controlling unit 22.

When an instruction to establish a path to the "destination address B" over "ATM" is received from the service controlling unit 23g, the egress signal controlling unit 24a requests establishment of the path over ATM from the ATM line controlling unit 24c. Once the path is established over ATM, the egress signal controlling unit 24a transmits an ISUP_IAM signal or a BISUP_IAM signal to the called "destination address B", via the signal forwarding controlling unit 22.

The STM line controlling unit 24b is a processing unit that establishes a path between a caller terminal and a called terminal using an STM line. For example, when an instruction to establish a path to the "destination address A" over "STM" is received, the STM line controlling unit 24b establishes a path for exchanging voice signals between the caller terminal and the called terminal using an STM physical line assigned to the U-PLANE controller 25.

The ATM line controlling unit 24c is a processing unit that establishes a path between a caller terminal and a called terminal using an ATM line. For example, when an instruction to establish a path to the "destination address B" over "ATM" is received, the ATM line controlling unit 24c establishes a path for exchanging voice signals between the caller terminal and the called terminal using an ATM physical line assigned to the U-PLANE controller 25.

The U-PLANE controller 25 is a processing unit that establishes a U-PLANE path. The U-PLANE controller 25 is assigned with physical lines such as STM physical lines 25a-1 to 25a-n and ATM physical lines 25b-1 to 25b-n (where n is a natural number). The U-PLANE controlling unit 24 in the software controller 21 establishes a path using these physical lines.

Functional Configuration of Not-Congested Call Control Server

Figure 7:
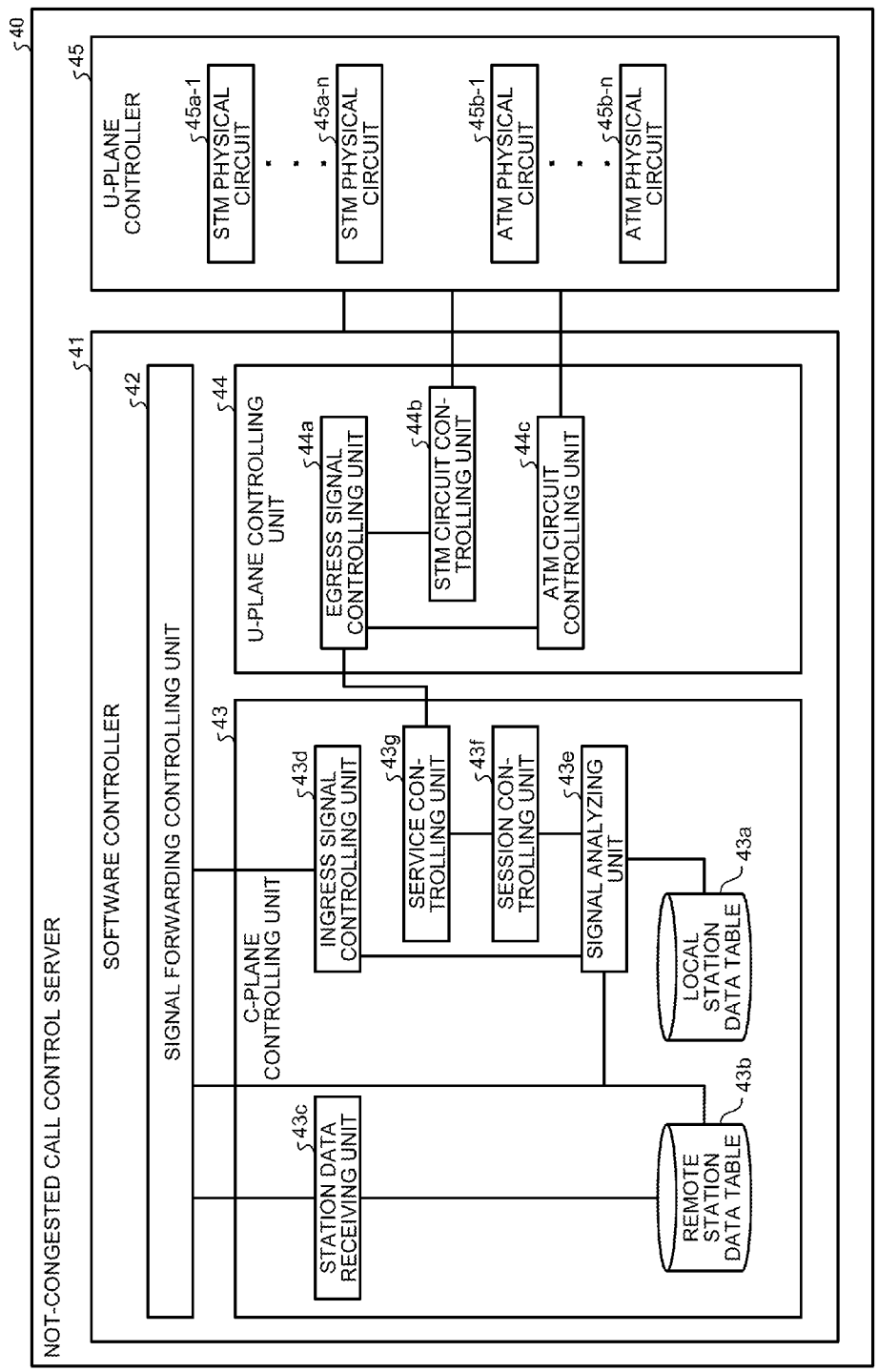
FIG. 7 is a functional block diagram illustrating a functional configuration of a not-congested call control server according to the first embodiment.

FIG. 7 is a functional block diagram illustrating a functional configuration of a not-congested call control server according to the first embodiment. As illustrated in FIG. 7, the not-congested call control server 40 includes a software controller 41 and a U-PLANE controller 45 both of which have the same functions as those in the congested call control server 20. The software controller 41 and the U-PLANE controller 45 are implemented as a process executed by a processor or the like, or as an electrical line in the processor.

A local station data table 43a, a remote station data table 43b, a station data receiving unit 43c, and a signal analyzing unit 43e, being functions of a C-PLANE controlling unit 43 illustrated in FIG. 7 and that are different from those illustrated in FIG. 5, will now be explained.

An ingress signal controlling unit 43d, a session controlling unit 43f, and a service controlling unit 43g have the same functions as the ingress signal controlling unit 23d, the session controlling unit 23f, and the service controlling unit 23g explained with reference to FIG. 5. A U-PLANE controlling unit 44 has the same function as the U-PLANE controlling unit 24 explained with reference to FIG. 5, and the U-PLANE controller 45 has the same function as the U-PLANE controller 25 explained with reference to FIG. 5.

The local station data table 43a is a table storing therein station data providing the information of terminal devices located in a particular region managed by the not-congested call control server 40. The local station data table 43a is stored in the memory or the hard disk, for example. Because the same information is stored in the local station data table 43a as that illustrated in FIG. 6, a detailed explanation thereof is omitted herein.

The remote station data table 43b is a station data received from the congested call control server 20, and is a table storing therein station data indicating the information of terminal devices located in the particular region managed by the congested call control server 20. The remote station data table 43b is stored in the memory or the hard disk, for example. Because the same information is stored in the remote station data table 43b as that illustrated in FIG. 6, a detailed explanation thereof is omitted herein.

The station data receiving unit 43c is a processing unit that receives the station data from the congested call control server 20. For example, the station data receiving unit 43c receives the station data from the congested call control server 20 on which congestion is detected, and stores the station data in the remote station data table 43b.

When the station data receiving unit 43c stores the station data in the remote station data table 43b, the station data receiving unit 43c may also store the information identifying the congested call control server 20 from which the station data is received. Such information allows identification of the congested call control server to which the station data belongs when a plurality of call control servers become congested.

The signal analyzing unit 43e is a processing unit that analyzes a received signal, and executes a process corresponding to the analysis result. For example, the signal analyzing unit 43e extracts a called telephone number from a received INVITE signal. If a destination corresponding to the extracted called telephone number is stored in the local station data table 43a, the signal analyzing unit 43e executes the same process as that performed by the signal analyzing unit 23e explained with reference to FIG. 5.

If the called telephone number extracted from the received INVITE signal is stored in the remote station data table 43b but not in the local station data table 43a, the signal analyzing unit 43e sends a notification to the congested call control server 20. For example, the signal analyzing unit 43e identifies the destination and the line associated with the called telephone number from the remote station data table 43b, and transmits the identified destination and line to the congested call control server 20 as C-PLANE information. At this time, the signal analyzing unit 43e may append the identifier of the call control server from which the station data is received to the called telephone number or the like in the remote station data table 43b so as to allow the congested call control server 20 to which the C-PLANE information is transmitted to be identified.

Descriptions of Processes

Figure 8:
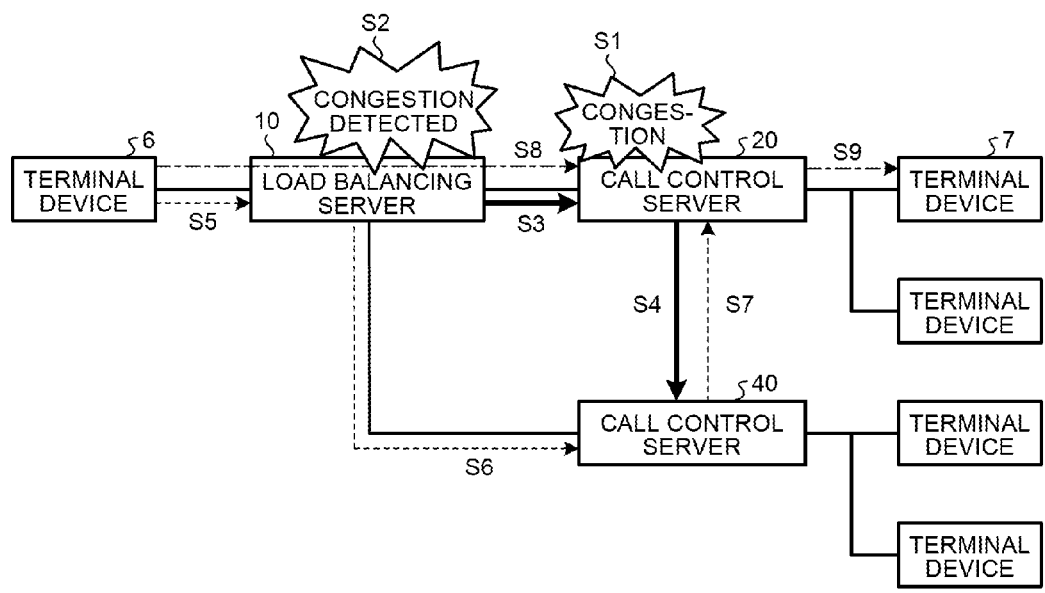
FIG. 8 is a schematic for explaining a process performed when congestion occurs in the first embodiment.

FIG. 8 is a schematic for explaining a process performed when congestion occurs in the first embodiment. As illustrated in FIG. 8, if the call control server 20 becomes congested (Step S1), the load balancing server 10 detects the congestion on the call control server 20 (Step S2).

The load balancing server 10 then instructs the call control server 20 from which the congestion is detected to transfer the station data (Step S3). The call control server 20 receiving the instruction transmits the station data to the call control server 40 (Step S4).

The terminal device 6 then transmits a SIP connection request to a terminal device 7 (Step S5). The load balancing server 10 transmits the request to the call control server 40, but not to the call control server 20 that is to establish a connection with the terminal device 7 (Step S6).

The call control server 40 executes C-PLANE control based on the SIP connection request, and transmits the C-PLANE information to the call control server 20 (Step S7).

The call control server 20 then identifies the line and the called terminal based on the C-PLANE control information received from the call control server 40, and establishes a path between the caller terminal device 6 and the called terminal device 7 (Step S8 and Step S9).

Process Sequence

The sequence of a process performed in the communication system 5 will now be explained. Explained now are an overall sequence, a process performed by the load balancing server, a process performed by the congested call control server, and a process performed by the not-congested call control server.

Overall Sequence of Process

Figure 9:
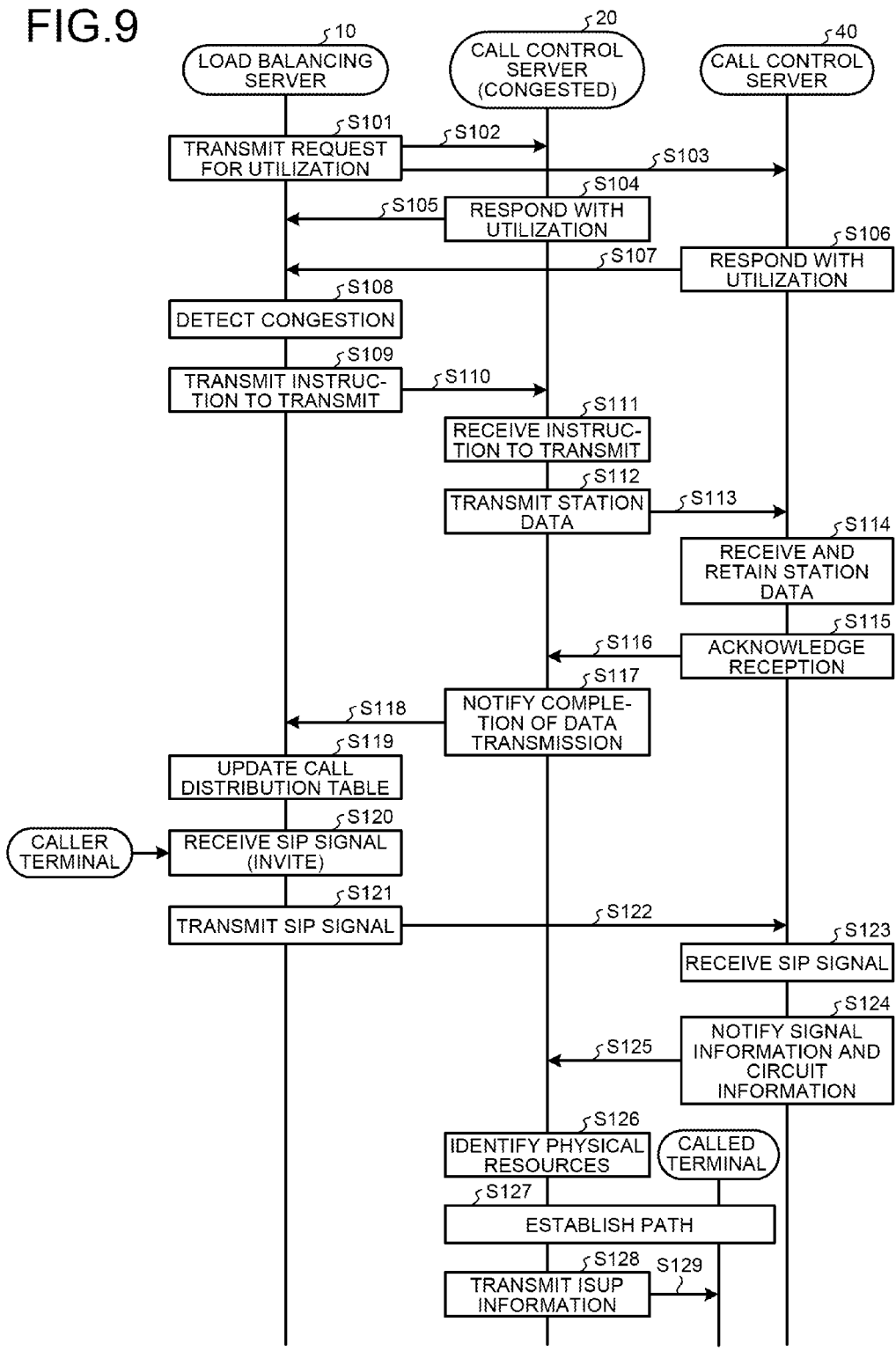
FIG. 9 is a sequence chart illustrating the sequence of a process according to the first embodiment.

FIG. 9 is a sequence chart illustrating the sequence of the process according to the first embodiment. As illustrated in FIG. 9, the load balancing server 10 transmits a request for CPU utilization to the call control server 20 and to the call control server 40 (Step S101 to Step S103).

The call control server 20 receives the request for CPU utilization, acquires the CPU utilization, and responds to the load balancing server 10 (Step S104 and Step S105). Similarly, the call control server 40 receives the request for CPU utilization, acquires the CPU utilization, and responds to the load balancing server 10 (Step S106 and Step S107).

The load balancing server 10 then detects congestion on the call control server 20 based on the CPU utilization acquired from the call control servers (Step S108), and instructs the call control server 20 to transmit the station data (Step S109 and Step S110).

The call control server 20 receives the station data transmission instruction from the load balancing server 10 (Step S111), reads the station data from the station data table 23a, and transmits the station data to the call control server 40 that is not congested (Step S112 and Step S113).

The call control server 40 then receive the station data from the congested call control server 20, retains the data in the memory or the like (Step S114), and transmits a reception acknowledgement to the call control server 20 (Step S115 and Step S116).

The call control server 20 receiving the reception acknowledgement transmits a notification of the completion of the station data transmission to the load balancing server 10 (Step S117 and Step S118). The load balancing server 10 receives the notification of the completion of the station data transmission, and updates the congestion status and the allocated server number in the call distribution table 12 (Step S119).

When the load balancing server 10 receives a SIP INVITE signal from the caller terminal device 6 (Step S120), the load balancing server 10 transmits the received SIP INVITE signal to the call control server 40 to which the signal is offloaded (Step S121 and Step S122). Specifically, the load balancing server 10 identifies the call control server that manages the called number included in the INVITE signal, with the called number from the call distribution table 12. If the call control server is congested, the load balancing server 10 transmits the INVITE signal to the server to which signal is offloaded.

The call control server 40 receives the SIP INVITE signal that is originally intended to be processed by the call control server 20 from the load balancing server 10 (Step S123), identifies the signal information and the line information on behalf of the congested call control server 20, and notifies the call control server 20 of the information (Step S124 and Step S125). Specifically, the call control server 40 identifies the destination and the line by referring to the remote station data table 43b using the called number included in the INVITE signal as a key, and notifies the destination and the line.

The call control server 20 identifies a physical resource based on the received signal information and line information (Step S126), and establishes a path between the called terminal device 7 and the caller terminal device 6 (Step S127). The call control server 20 also transmits information such as ISUP to the called terminal device 7 (Step S128 and Step S129). Specifically, the call control server 20 establishes a connection between the notified destination and source using the notified line.

Sequence of Congestion Detection Process Performed by Load Balancing Server

Figure 10:
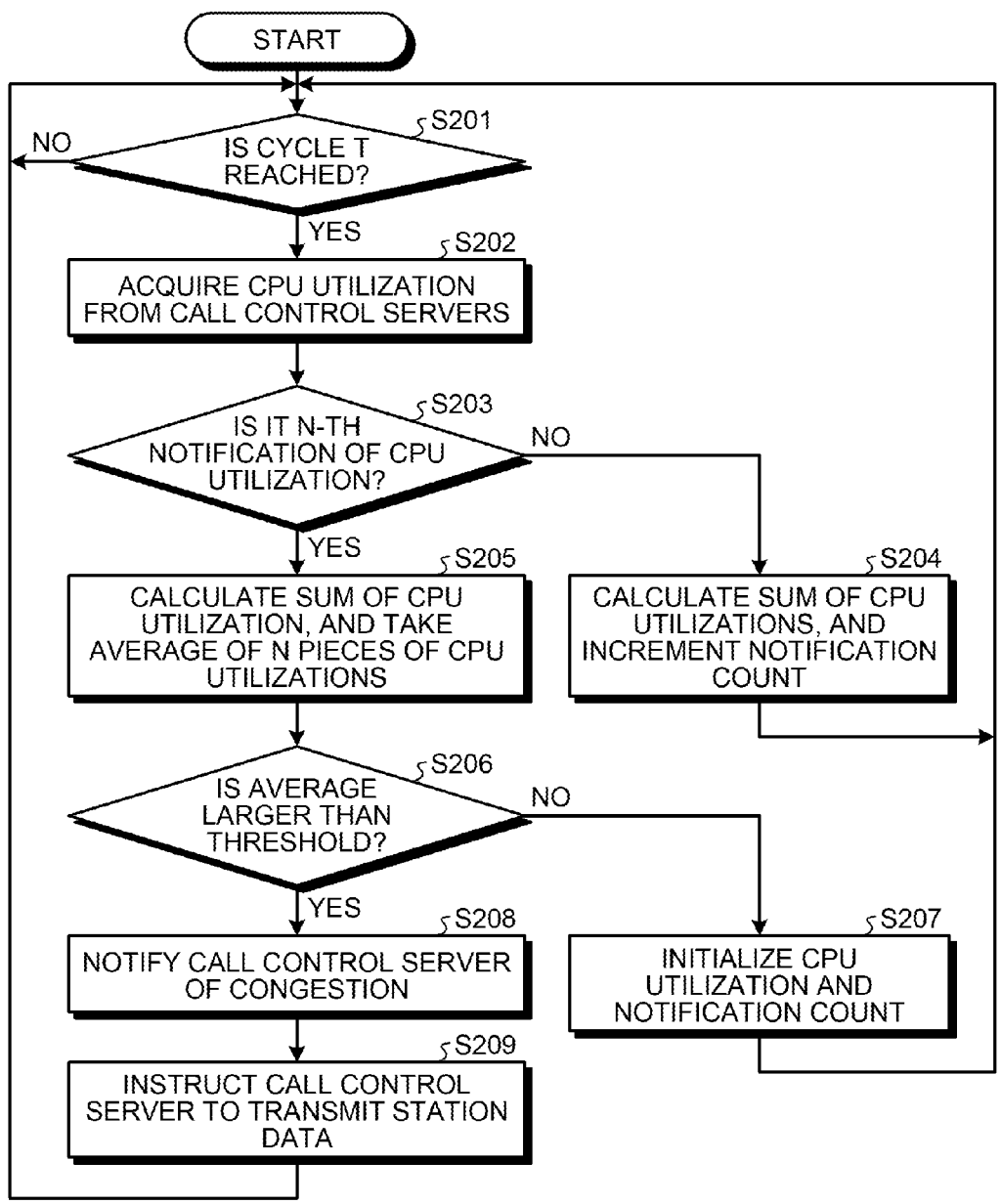
FIG. 10 is a flowchart illustrating the sequence of a congestion detection process performed by a load balancing server.

FIG. 10 is a flowchart illustrating the sequence of a congestion detection process performed by the load balancing server. This process is run for each of the call control servers, but the call control server 20 is used as an example in the following explanation.

As illustrated in FIG. 10, when a cycle T that is a monitoring cycle is reached (Yes at Step S201), the utilization monitoring unit 13 in the load balancing server 10 acquires the CPU utilization from the call control server 20 (Step S202).

The congestion detecting unit 14 determines that if it is the Nth notification of the CPU utilization (Step S203). If the notification is a less-than-Nth notification of the CPU utilization (No at Step S203), the congestion detecting unit 14 calculates the sum of the CPU utilizations, and increments the notification count (Step S204). If the notification is the Nth notification (Yes at Step S203), the congestion detecting unit 14 calculates the sum of the CPU utilizations, and takes the average of the N pieces of CPU utilization (Step S205).

If the average CPU utilization is lower than a threshold (No at Step S206), the congestion detecting unit 14 initializes the CPU utilization, and initializes the notification count (Step S207). In other words, the congestion detecting unit 14 sets the CPU utilization and the notification count to zero.

If the average CPU utilization is higher than the threshold (Yes at Step S206), the transfer instructing unit 15 notifies the call control server 20 of the occurrence of congestion (Step S208). The transfer instructing unit 15 then instructs the call control server 20 to transmit the station data (Step S209). At this time, the transfer instructing unit 15 may also transmit a destination to which the station data is to be transmitted.

Sequence of Load Balancing Process Performed by Load Balancing Server

Figure 11:
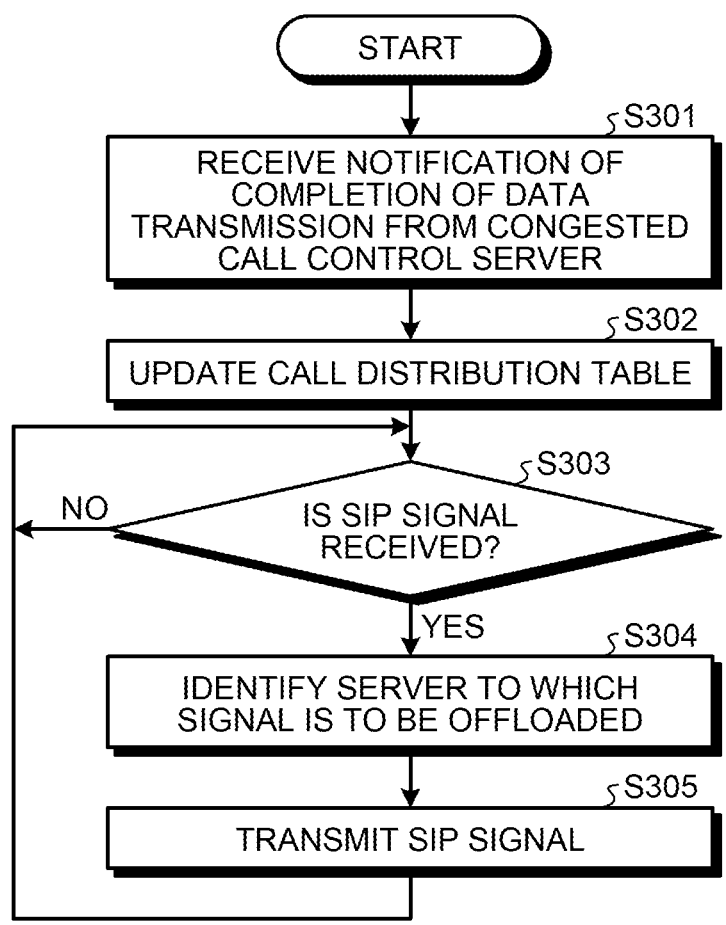
FIG. 11 is a flowchart illustrating the sequence of a load balancing process performed by the load balancing server subsequent to a detection of congestion.

FIG. 11 is a flowchart illustrating the sequence of a load balancing process performed by the load balancing server subsequent to a detection of congestion. This process is run for each congested call control server, but the call control server 20 is explained used as an example, as the congested call control server 20.

As illustrated in FIG. 11, the notification receiving unit 16 in the load balancing server 10 receives a notification of the completion of the station data transmission from the congested call control server (Step S301). When information such as a server to which signals are offloaded is described in the received notification of the completion, the notification receiving unit 16 updates the call distribution table 12 (Step S302).

When a SIP signal is received (Yes at Step S303), the signal transmitting and receiving unit 17 refers to the call distribution table 12 to identify the server to which the signal is to be offloaded (Step S304), and transmits the received SIP signal to the identified call control server to which signal is to be offloaded (Step S305).

Figure 12:
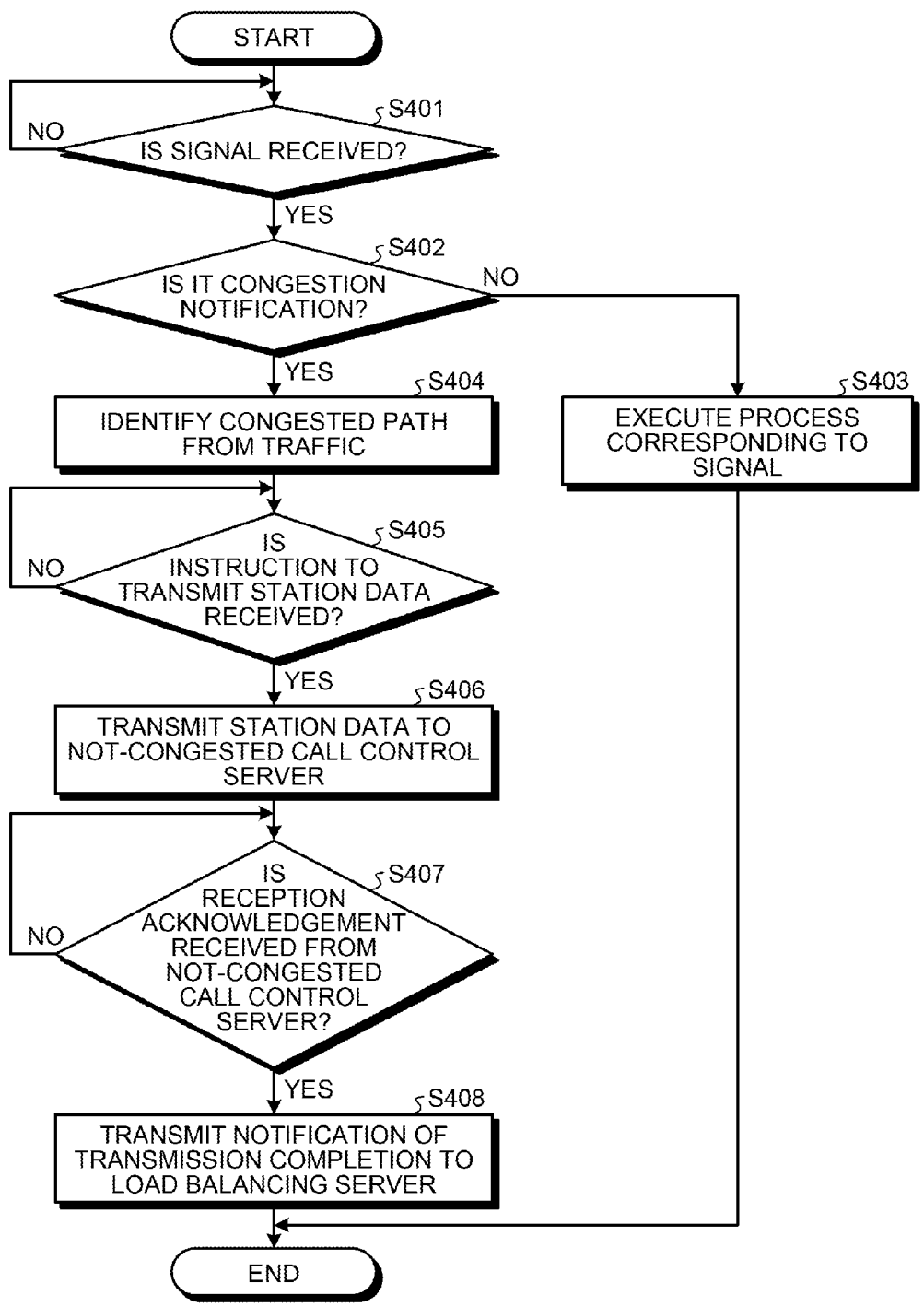
FIG. 12 is a flowchart illustrating the sequence of a process performed by the call control server when congestion is detected.

Sequence of Process Performed by Call Control Server when Congestion is Detected FIG. 12 is a flowchart illustrating the sequence of a process performed by the call control server when congestion is detected. The call control server 20 is used as an example in the following explanation.

As illustrated in FIG. 12, when a signal is received (Yes at Step S401), the signal forwarding controlling unit 22 in the call control server 20 determines if the signal is a congestion notification transmitted by the load balancing server 10, based on the header of the signal and the identification, the message, or the like included in the signal (Step S402).

If the received signal is not a congestion notification (No at Step S402), the session controlling unit 23f or the service controlling unit 23g executes a process suitable for the signal (Step S403). In other words, the call control server 20 executes general C-PLANE control or U-PLANE control.

If the signal forwarding controlling unit 22 determines that the signal is a congestion notification (Yes at Step S402), the congestion detecting unit 23b and the like identify a congested path from the traffic (Step S404).

If an instruction to transmit station data is then received (Yes at Step S405), the station data transmitting unit 23c reads the station data from the station data table 23a, and transmits the station data to the not-congested call control server (Step S406).

If a reception acknowledgement for the station data is received from the not-congested call control server (Yes at Step S407), the station data transmitting unit 23c notifies the load balancing server 10 of the completion of the transmission of the station data (Step S408).

Figure 13:
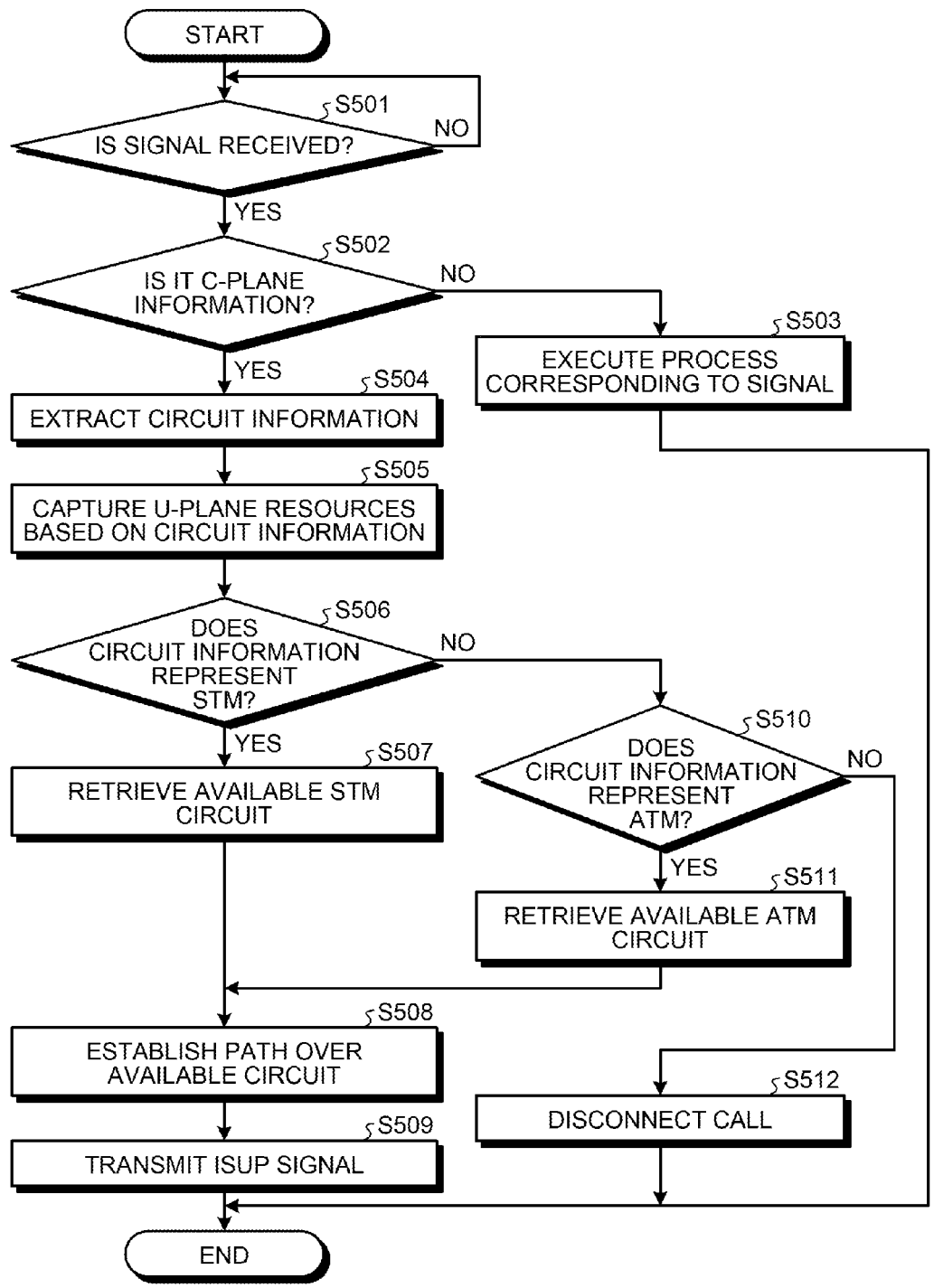
FIG. 13 is a flowchart illustrating the sequence of a call control process performed by the call control server subsequent to a detection of congestion.

Sequence of Call Control Process Performed by Call Control Server Subsequent to Congestion Detection FIG. 13 is a flowchart illustrating the sequence of a call control process performed by the call control server subsequent to a detection of congestion. The call control server 20 is used as an example in the following explanation.

As illustrated in FIG. 13, when a signal is received (Yes at Step S501), the signal forwarding controlling unit 22 in the call control server 20 determines if the signal is C-PLANE information transmitted by the not-congested call control server, based on the header of the signal and the identification, the message, or the like included in the signal (Step S502).

If the received signal is not C-PLANE information (No at Step S502), the session controlling unit 23f or the service controlling unit 23g executes a process suitable for the signal (Step S503).

If the signal forwarding controlling unit 22 determines that the signal is C-PLANE information (Yes at Step S502), the signal analyzing unit 23e extracts the line information from the received signal (Step S504). At this time, the signal analyzing unit 23e extracts the called telephone number from the received signal, and identifies the called terminal device 7.

The session controlling unit 23f then identifies a line to be used from the line information, and captures the U-PLANE resource (Step S505). If the line information represents STM (Yes at Step S506), the U-PLANE controlling unit 24 refers to the U-PLANE controller 25, and retrieves an available STM line (Step S507).

The U-PLANE controlling unit 24 then requests establishment of a path over the available STM line from the U-PLANE controller 25, and the U-PLANE controller 25 establishes a path between the caller terminal and the called terminal using the available STM line (Step S508). Once the path is established, the egress signal controlling unit 24a transmits an ISUP signal to the called terminal (Step S509).

If the line information does not represent STM (No at Step S506), the U-PLANE controlling unit 24 refers to the U-PLANE controller 25, and retrieves an available ATM line (Step S510).

If the line information represents ATM (Yes at Step S510), the U-PLANE controlling unit 24 executes Step S511. In other words, the U-PLANE controlling unit 24 requests establishment of a path over the available ATM line from the U-PLANE controller 25, and the U-PLANE controller 25 establishes a path between the caller terminal and the called terminal using the available ATM line. Once the path is established, the egress signal controlling unit 24a transmits an ISUP signal to the called terminal (Step S509).

If the line information does not also represent ATM (No at Step S510), the session controlling unit 23f disconnects the call (Step S512).

Sequence of Call Control Process Performed by not-Congested Call Control Server

Figure 14:
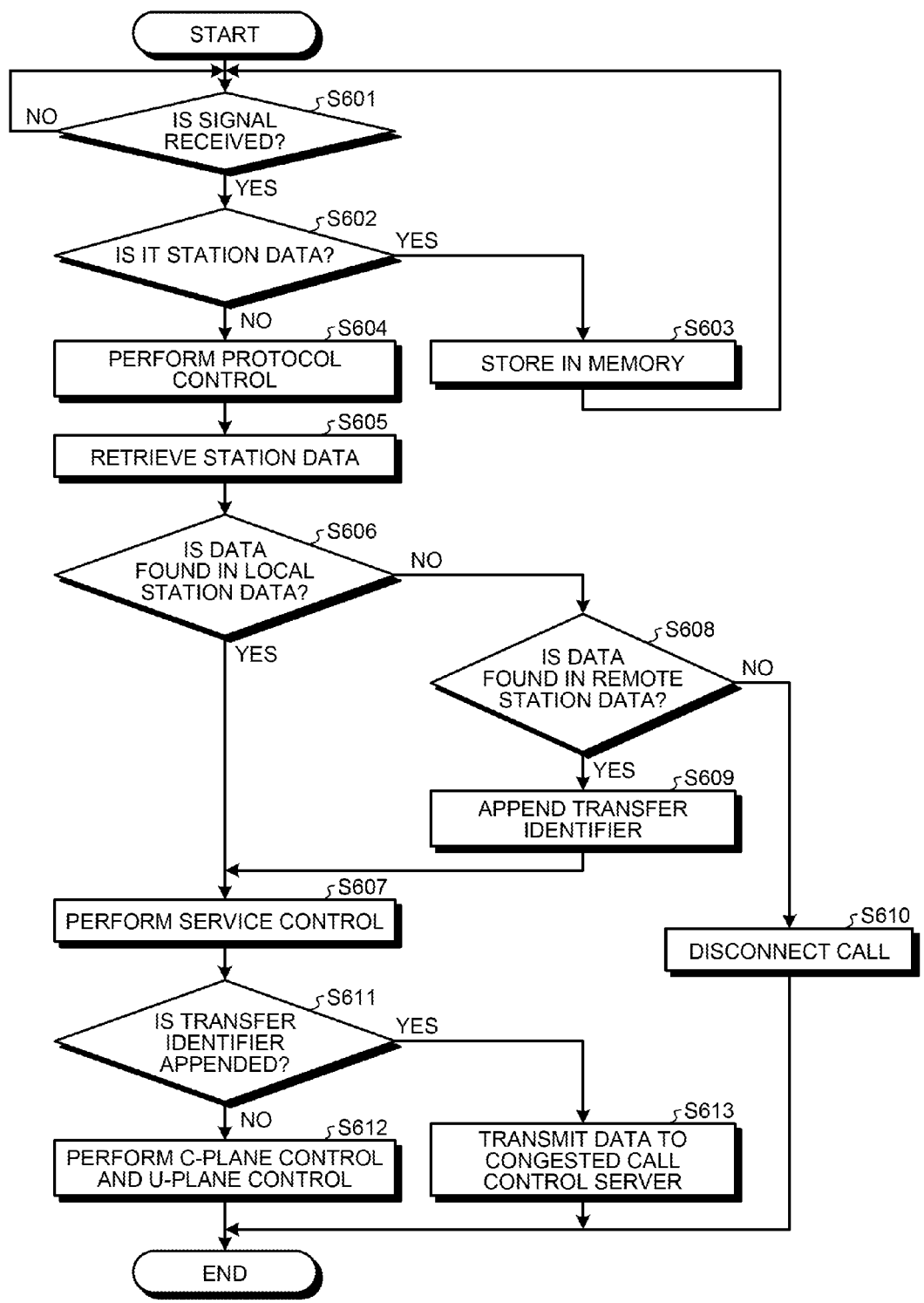
FIG. 14 is a flowchart illustrating the sequence of a call control process performed by a not-congested call control server.

FIG. 14 is a flowchart illustrating the sequence of a call control process performed by a not-congested call control server. The call control server 40 is used as an example in the following explanation.

As illustrated in FIG. 14, when a signal is received (Yes at Step S601), a signal forwarding controlling unit 42 in the call control server 40 that is a not-congested server determines if the received signal is the station data transmitted by a congested call control server based on the identification, the message, or the like included in the signal (Step S602).

If the received signal is the station data of another station (Yes at Step S602), the station data receiving unit 43c stores the received station data of another station in the remote station data table 43b (Step S603). At this time, the station data receiving unit 43c may also store the identifier identifying the call control server from which the station data is received.

If the received signal is not the station data of another station, and is a regular SIP signal (No at Step S602), the ingress signal controlling unit 43d executes the protocol control including receiving of a reception acknowledgement (Step S604).

The signal analyzing unit 43e retrieves the local station data table 43a using the called telephone number included in the received SIP signal as a key (Step S605). If the called telephone number is stored in the local station data table 43a (Yes at Step S606), the session controlling unit 43f or the service controlling unit 43g executes the service control including identification of a line to be used and identification of the called terminal (Step S607).

If the called telephone number is not stored in the local station data table 43a (No at Step S606), but stored in the remote station data table 43b (Yes at Step S608), the signal analyzing unit 43e executes Step S609. In other words, the signal analyzing unit 43e appends a transfer identifier, identifying that the station data has been transferred, to the received station data of the other station. As a result, the transfer identifier is appended to any processing result using the received station data of the other station. The session controlling unit 43f or the service controlling unit 43g then executes Step S607.

If the received data is not the station data of another station (No at Step S608), the session controlling unit 43f disconnects the call (Step S610).

If any transfer identifier is not appended (No at Step S611), the session controlling unit 43f or the service controlling unit 43g executes the U-PLANE control including the establishment of a path using a transmission line resource of the local station, and the C-PLANE control including the transmission of an ISUP signal (Step S612).

If any transfer identifier is appended (Yes at Step S611), the signal analyzing unit 43e transmits the C-PLANE information including a destination and line information to the congested call control server 20 (Step S613).

Advantageous Effects

In the manner described above, in the communication system 5, when the CPU load of a call control server increases due to a sudden increase of call traffic to the call control server, another call control server that is not congested can handle the C-PLANE control on behalf of the congested call control server. The congested call control server can therefore establish a path just by executing the U-PLANE that imposes a small CPU load and that can be executed during the congestion. As a result, the transmission line resources of the congested call control server can be used effectively. Furthermore, because the transmission line resources of the call control servers can be used effectively, the availability of the telephone service can be improved.

[b] Second Embodiment

Explained in the first embodiment is an example in which the call establishment load of a congested call control server is offloaded to a not-congested call control server, but the present invention is not limited thereto. For example, it is possible to predict how the CPU utilization will change in each of the not-congested call control servers, and to determine the ratio at which the load is distributed to each of the not-congested call control servers based on the CPU utilization prediction result.

Figures 15, 16:
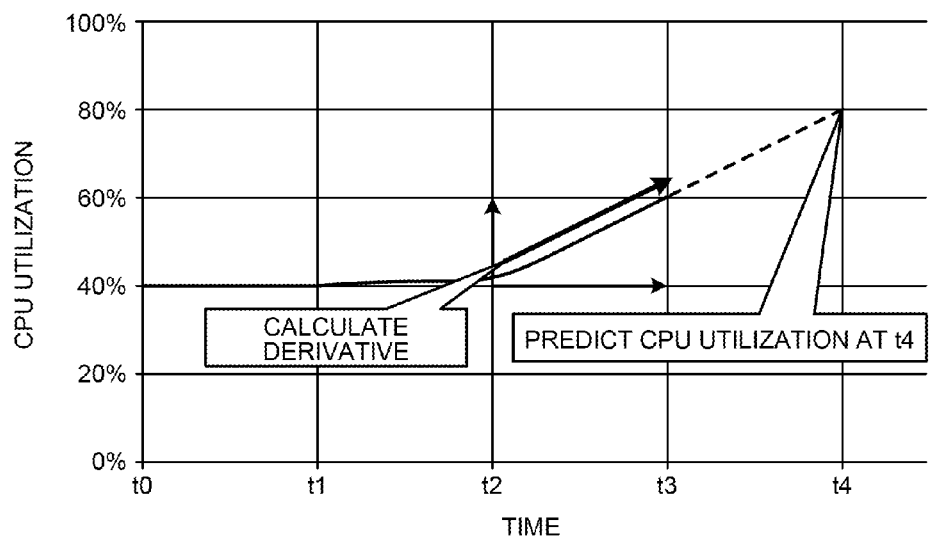
FIG. 15 is a schematic for explaining a CPU utilization prediction according to a second embodiment of the present invention.
FIG. 16 is a schematic for explaining an example of a distribution ratio determined using CPU utilization in the second embodiment.

Explained now in a second embodiment of the present invention is an example in which the ratio at which the load is distributed to each of the not-congested call control servers is determined based on a result of predicting the CPU utilization before the load is distributed. FIG. 15 is a schematic for explaining the CPU utilization prediction according to the second embodiment. As illustrated in FIG. 15, the load balancing server 10 calculates a derivative of a change in CPU utilization from past time to current time, and predicts how the CPU utilization is to change using the derivative.

Explained now is an exemplary CPU utilization prediction at future time t4 when the current time is t3. The load balancing server 10 can calculate the CPU utilization of the future time t4 from the equation "CPU utilization at current time t3+($\Delta$CPU utilization/$\Delta$t)×(future time t4−current time t3)". The $\Delta$CPU utilization can be calculated by subtracting the CPU utilization at past time t2 from the CPU utilization at the current time t3, and $\Delta$t can be calculated by subtracting the past time t2 from the current time t3.

When the CPU utilization of the call control server 40 that is not congested is predicted to be 10 percent at the future time t4, and the CPU utilization of the call control server 60 is predicted to be 20 percent at the future time t4, for example, the load balancing server 10 determines the distribution ratio at which the load is to be offloaded to the call control server 40 and to offloaded to the call control server 60 as one to two.

FIG. 16 is a schematic for explaining an example of the distribution ratio determined using the CPU utilization in the second embodiment. FIG. 16 illustrates a configuration of call distribution table. As illustrated in FIG. 16, the call distribution table 12 in the load balancing server 10 retains the call distribution ratio, in addition to the information according to the first embodiment explained with reference to FIG. 4. The "call distribution ratio" is a ratio at which the calls of the congested call control server is distributed to the other call control servers, and is determined based on the CPU utilization prediction result. In the example illustrated in FIG. 16, the calls intended to be handled by the congested call control server 20 are distributed to the call control server 40 and the call control server 60 at a ratio of one to two.

Figure 17:
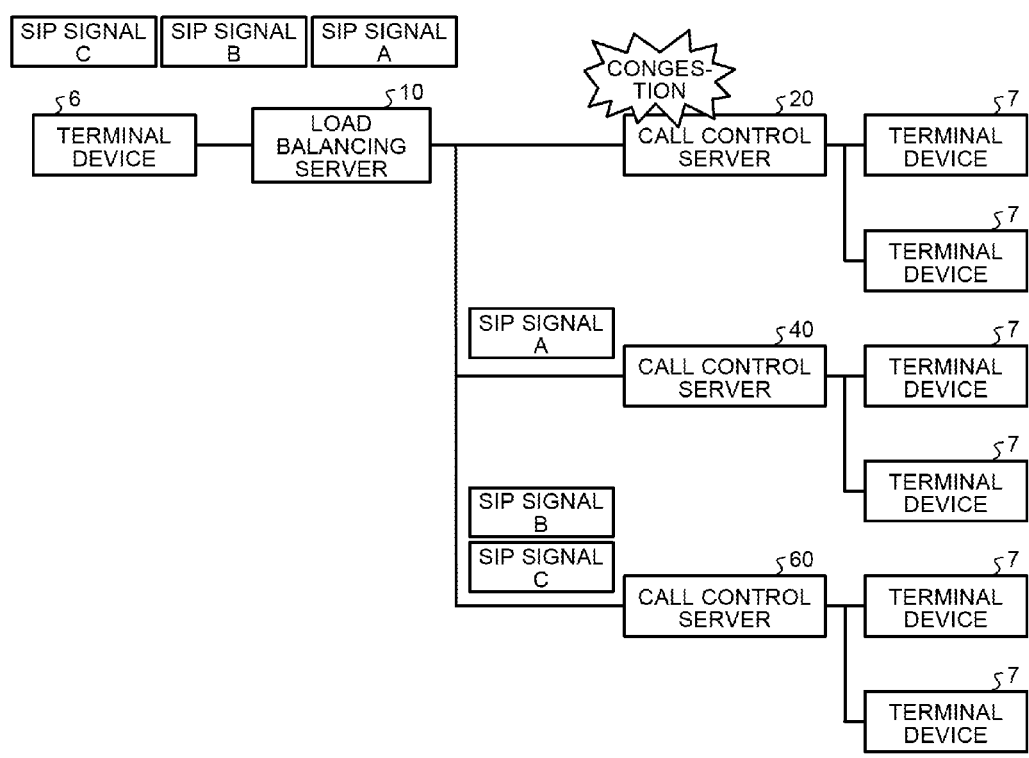
FIG. 17 is a schematic for explaining an example how calls are offloaded according to the second embodiment.

The call distribution will now be explained specifically with reference to FIG. 17. FIG. 17 is a schematic for explaining an example of the call distribution according to the second embodiment. Illustrated in the system diagram in FIG. 17 is an example in which the call control server 20 is congested, and the calls at the congested call control server 20 are to be distributed to the call control server 40 and the call control server 60 at a ratio of one to two.

As illustrated in FIG. 17, when three signals including a SIP signal A, a SIP signal B, and a SIP signal C are received sequentially, the load balancing server 10 transmits one of the signals to the call control server 40, and transmits the remaining two SIP signals to the call control server 60, because the distribution ratio is one to two. As an example, the load balancing server 10 transmits the SIP signal A to the call control server 40, and transmits the SIP signal B and the SIP signal C to the call control server 60.

In this manner, in the second embodiment, the load balancing server 10 can dynamically change the distribution ratio based on the CPU utilization of the servers to which signals are offloaded, distribute the calls for the congested call control server to these servers, and have these servers to process the calls. In other words, the load balancing server 10 can distribute the calls in such a manner that the CPU utilizations of the respective servers are balanced out. For example, the load balancing server 10 distributes call control requests for the terminal device 6 at a ratio which smoothes loads of the not-congested call control servers. In this manner, it is possible to prevent the calls for the congested call control server from concentrating at one not-congested call control server. Because the processing load of not-congested call control servers can be distributed, it is possible to suppress congestion by causing a not-congested call control server to process the calls for the congested call control server.

[c] Third Embodiment

Explained in the first embodiment is an example in which the station data is transmitted when congestion is detected, but the present invention is not limited thereto. For example, the station data may be transmitted before congestion will occur. Explained now in a third embodiment of the present invention is an example in which a prediction is made as to when congestion occurs and the station data is transmitted before the congestion occurs.

Figure 18:
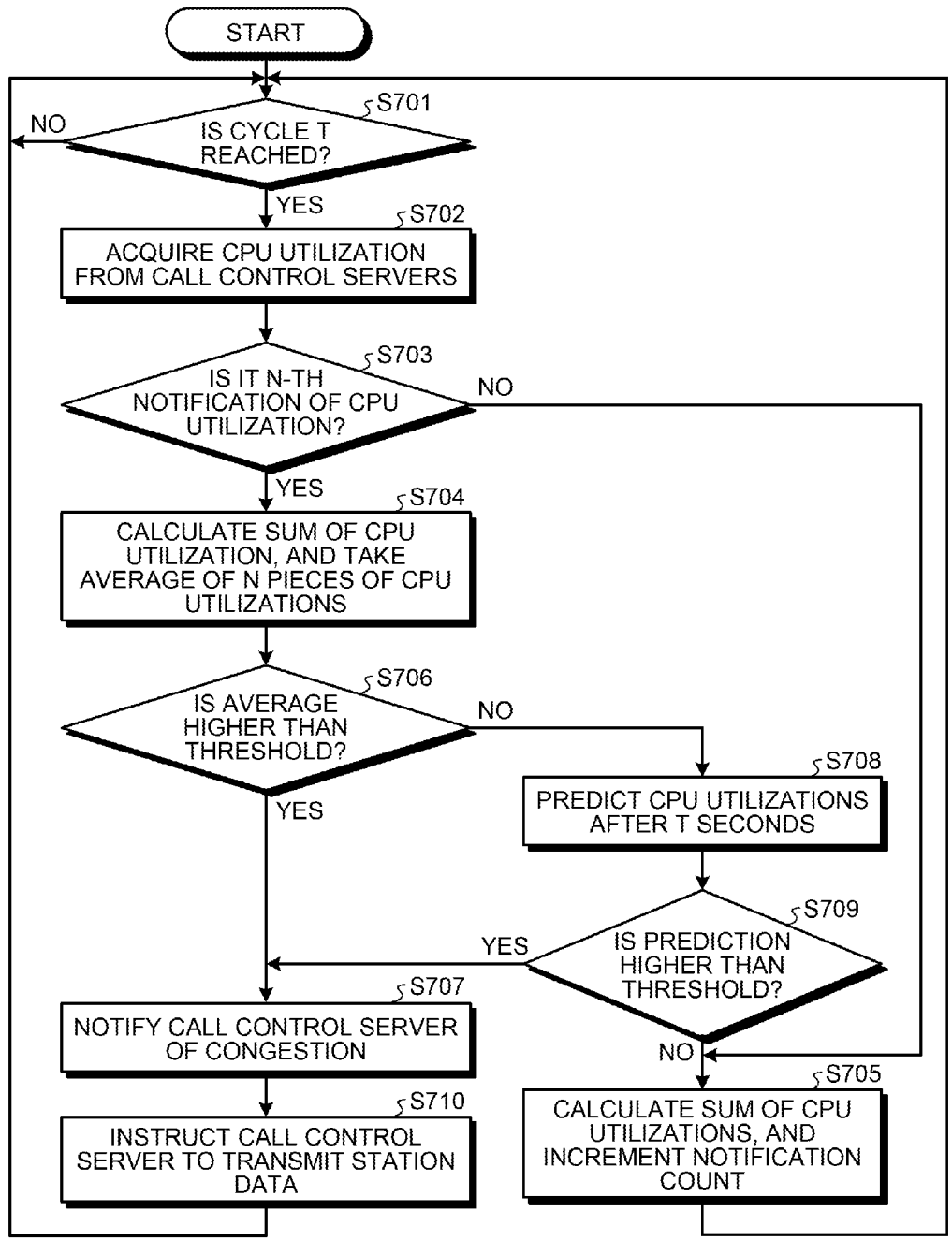
FIG. 18 is a flowchart for explaining the sequence of a congestion prediction process according to a third embodiment of the present invention.

Explained in this example is an approach in which a change in the CPU utilization load is predicted. The same prediction method as that in the second embodiment may be used. FIG. 18 is a flowchart for explaining the sequence of a congestion prediction process according to the third embodiment. This process is run for each of the call control servers, but the call control server 20 is used as an example in the explanation.

As illustrated in FIG. 18, when the cycle T that is a monitoring cycle is reached (Yes at Step S701), the utilization monitoring unit 13 in the load balancing server 10 acquires the CPU utilization from the call control server 20 (Step S702).

The congestion detecting unit 14 then determines if the notification is the Nth notification of the CPU utilization (Step S703). If the notification is a less-than-Nth notification of the CPU utilization (No at Step S703), the congestion detecting unit 14 calculates the sum of the CPU utilizations, and increments the notification count (Step S704). If the notification is the Nth notification of the CPU utilization (Yes at Step S703), the congestion detecting unit 14 calculates the sum of the CPU utilizations, and takes the average of the N pieces of CPU utilization (Step S705).

If the average CPU utilization is higher than the threshold (Yes at Step S706), the transfer instructing unit 15 notifies the call control server 20 of the occurrence of congestion (Step S707). The transfer instructing unit 15 then instructs the call control server 20 to transmit the station data (Step S708).

If the average CPU utilization is lower than the threshold (No at Step S706), the congestion detecting unit 14 predicts the CPU utilization after T seconds elapses (Step S708). If the prediction exceeds the threshold (Yes at Step S709), the congestion detecting unit 14 notifies the call control server 20 of the occurrence of congestion (Step S707). The transfer instructing unit 15 then instructs the call control server 20 to transmit the station data (Step S710).

If the prediction does not exceed the threshold (No at Step S709), the congestion detecting unit 14 calculates the sum of the CPU utilizations, and increments the notification count (Step S704).

Figure 19:
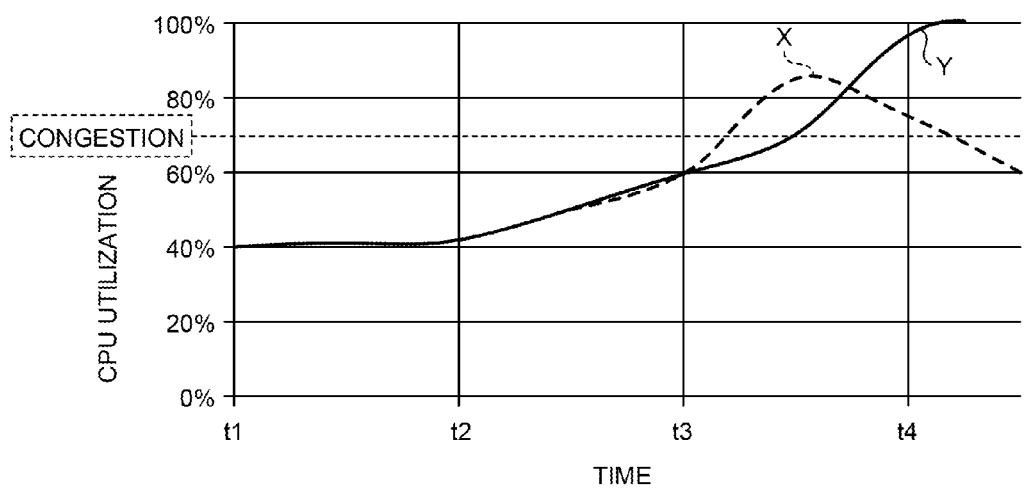
FIG. 19 is a schematic for explaining how congestion is avoided by transmitting the station data in advance.

FIG. 19 is a schematic for explaining how congestion is avoided by transmitting the station data in advance. The graph X illustrated in FIG. 19 indicates a change in the CPU utilization when the congestion prediction is used, and the graph Y illustrated in FIG. 20 indicates a change in the CPU utilization when the congestion prediction is not used.

The graph Y in FIG. 19 indicates that, if the CPU utilization has a tendency to increase and the station data is transmitted to another call control server after congestion occurs, the CPU utilization may be further increased by the transmission of the station data, and the transmission of the station data may fail.

By contrast, the graph X in FIG. 19 indicates that, because the station data is transferred before the congestion occurs, the transmission of the station data does not induce an increase in the CPU utilization. In this manner, the risk of a system down caused by a sudden increase of the CPU utilization can be suppressed.

[d] Fourth Embodiment

Figure 20:
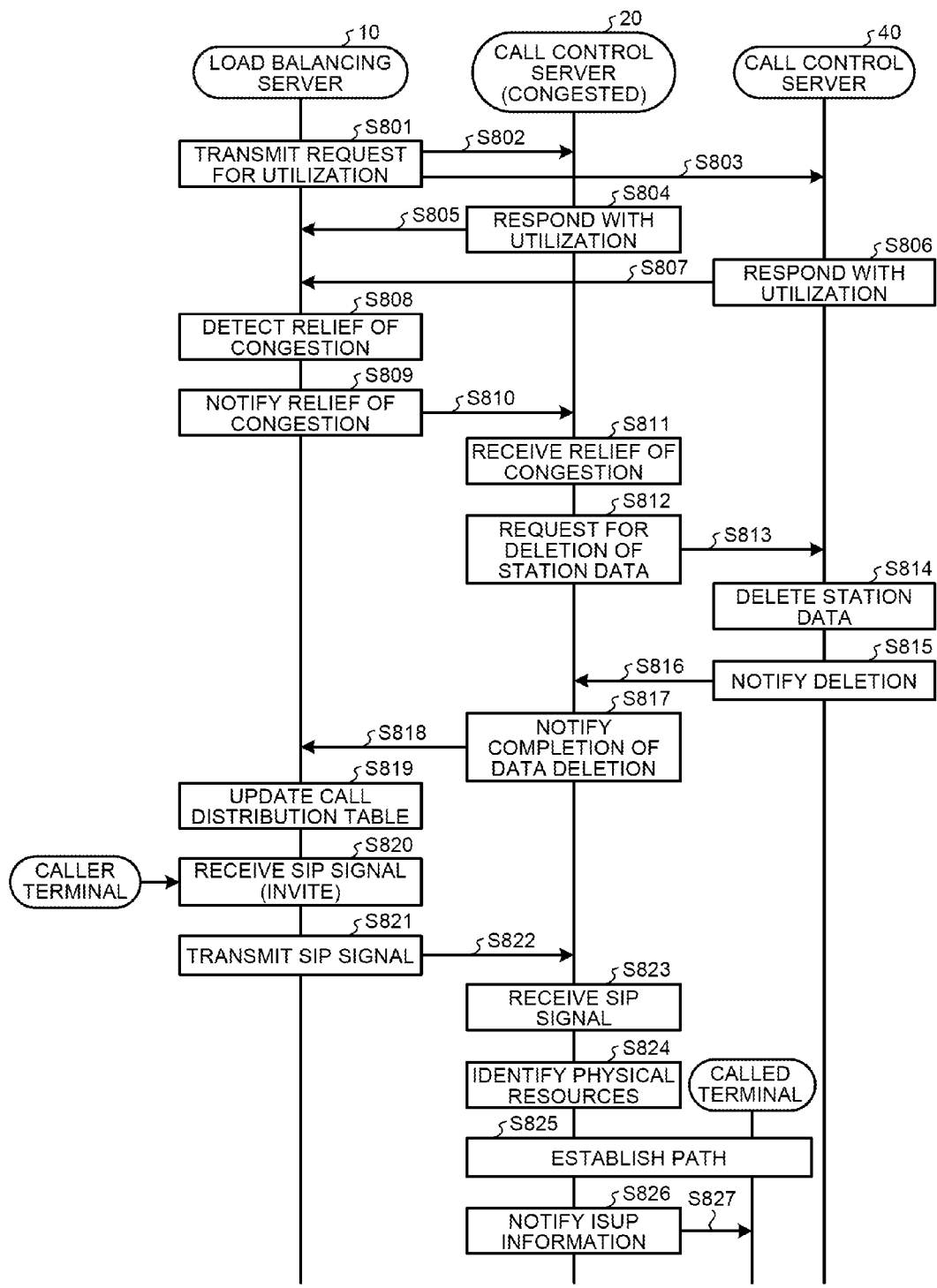
FIG. 20 is a sequence chart illustrating the sequence of a process of releasing the congestion control according to a fourth embodiment of the present invention.

Explained in a fourth embodiment of the present invention is a process performed after the congestion is relieved. FIG. 20 is a sequence chart illustrating the sequence of the process of releasing the congestion control according to the fourth embodiment. In this embodiment, the call control server 20 is congested, and the call control server 40 is not congested.

Sequence of Process

As illustrated in FIG. 20, the load balancing server 10 transmits a request for CPU utilization to the call control server 20 and to the call control server 40 (Step S801 to Step S803). The call control server 20 receives the request for CPU utilization, acquires the CPU utilization, and responds to the load balancing server 10 (Step S804 and Step S805). Similarly, the call control server 40 receives the request for CPU utilization, acquires the CPU utilization, and responds to the load balancing server 10 (Step S806 and Step S807).

The load balancing server 10 then detects that the congestion on the call control server 20 is now relieved based on the CPU utilizations acquired from the call control servers (Step S808), and the call control server 20 transmits a notification of the congestion relief (Step S809 and Step S810).

When the notification of the congestion relief is received from the load balancing server 10 (Step S811), the call control server 20 transmits a request for deleting the station data to the call control server 40 to which the station data has been transmitted (Step S812 and Step S813).

The call control server 40 then deletes the station data received from the call control server 20 having been congested from the memory or the like (Step S814), and transmits a deletion notification to the call control server 20 (Step S815 and Step S816).

The call control server 20 receiving the deletion notification transmits a notification of the completion of the station data deletion to the load balancing server 10 (Step S817 and Step S818). When the notification of the completion of station data deletion is received, the load balancing server 10 updates the congestion status and the allocated server number in the call distribution table 12 (Step S819).

When a SIP INVITE signal is then received from the caller terminal device 6 (Step S820), the load balancing server 10 transmits the received SIP INVITE signal to the call control server 20 (Step S821 and Step S822).

The call control server 20 then identifies the signal information and the line information from the received INVITE signal, and identifies physical resources to be used in establishing a path (Step S824). The call control server 20 then establishes a path between the called terminal device 7 and the caller terminal device 6 (Step S825). The call control server 20 also transmits information such as ISUP to the called terminal device 7 (Step S826 and Step S827).

Flowchart

Figure 21:
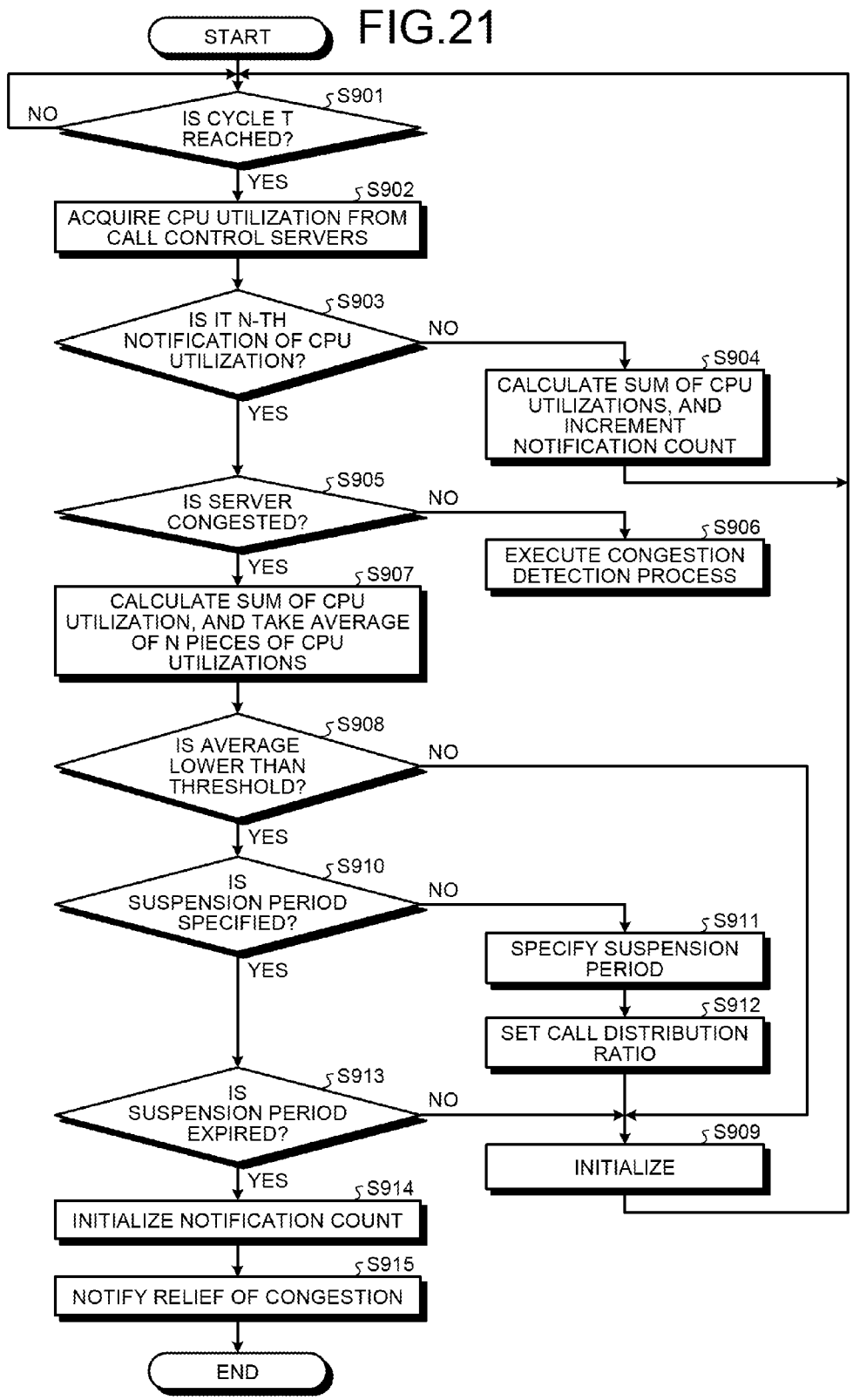
FIG. 21 is a flowchart illustrating the sequence of the process of releasing the congestion control performed by the load balancing server.

FIG. 21 is a flowchart illustrating the sequence of the process of releasing the congestion control performed by the load balancing server. This process is run for each of the call control servers, but in the following explanation, the call control server 20 will be used as an example.

As illustrated in FIG. 21, when the cycle T that is a monitoring cycle is reached (Yes at Step S901), the utilization monitoring unit 13 in the load balancing server 10 acquires the CPU utilization from the call control server 20 (Step S902).

The congestion detecting unit 14 then determines if the notification is the Nth notification of CPU utilization (Step S903). If the notification is a less-than-Nth notification of the CPU utilization (No at Step S903), the congestion detecting unit 14 calculates the sum of the CPU utilizations, and increments the notification count (Step S904).

If the notification is the Nth notification of the CPU utilization (Yes at Step S903), the congestion detecting unit 14 refers to the call distribution table 12, and determines if the target call control server 20 is congested (Step S905). At this time, if the target call control server 20 is not congested (No at Step S905), the congestion detecting unit 14 executes the congestion detection process illustrated in FIG. 10 (Step S906).

If the target call control server 20 is congested (Yes at Step S905), the congestion detecting unit 14 calculates the sum of the CPU utilizations, and takes the average of the N pieces of CPU utilization (Step S907). If the average CPU utilization is higher than the threshold (No at Step S908), the congestion detecting unit 14 initializes the CPU utilization, and initializes the notification count (Step S909).

If the average CPU utilization is lower than the threshold (Yes at Step S908), the congestion detecting unit 14 determines if a suspension period has been specified (Step S910). The suspension period is a period for which release of the congestion control is suspended after the congestion is relieved. In other words, the load balancing is released after the suspension period elapses from when the relief of congestion is detected. In this manner, it is possible to suppress recurrence of congestion on the same call control server immediately after the congestion is relieved, by bringing back the load to the control server having been congested and causing the call control server to execute the C-PLANE control.

If the suspension period has not been specified (No at Step S910), the congestion detecting unit 14 specifies a suspension period (Step S911), sets a predetermined call distribution ratio (Step S912), and executes Step S909. The call distribution ratio herein means a distribution ratio at which the calls are distributed to the congested call control server and the not-congested call control servers until the suspension period expires.

If the suspension period has been specified (Yes at Step S910) and is expired (Yes at Step S913), the congestion detecting unit 14 initializes the notification count (Step S914), and notifies the call control server 20 of the relief of the congestion (Step S915). If the suspension period has been specified (Yes at Step S910) but is not expired yet (No at Step S913), the congestion detecting unit 14 executes Step S909.

Advantageous Effects

In the manner described above, when the congestion is relieved, the communication system 5 automatically restores the condition prior to the congestion is relieved, so that the workload of an administrator can be reduced. Furthermore, because the station data of another station retained by a not-congested call control server is automatically deleted, any vulnerability can be reduced. Furthermore, because the congestion suspension period is established, reoccurrence of congestion can be suppressed, so that reliability can be improved.

[e] Fifth Embodiment

Some embodiments of the present invention are explained above, but the present invention may be implemented in various different forms, including those that will be explained below, in addition to those described above.

Incremental Release of Congestion Control

Before releasing the congestion control on the congested call control server, for example, the load balancing server 10 may release the congestion control incrementally to suppress reoccurrence of the congestion more reliably. Specifically, the load balancing server 10 controls the threshold of the CPU utilization incrementally.

For example, if the CPU utilization of the congested call control server falls lower than the threshold defined as a first stage threshold, the load balancing server 10 distributes the calls to the not-congested call control server and the congested call control server at a ratio of two to one. If the CPU utilization of the congested call control server falls lower than the threshold defined as a second stage threshold, the load balancing server 10 distributes the calls to the not-congested call control server and the congested call control server at a ratio of one to one.

If the CPU utilization of the congested call control server falls lower than the threshold defined as a third stage threshold, the load balancing server 10 determines that the congestion is completely relieved, and assigns all of the calls to the call control server from which the congestion control is released, without distributing the calls to the not-congested call control server. In this manner, a sudden surge of the processing load of the call control server from which congestion control is released can be avoided. These thresholds at the respective stages and distribution rates are merely exemplary, and may be set and changed in any way.

System

The whole or a part of each of the processes explained to be executed automatically in the embodiments may be executed manually, and the whole or a part of each of the processes explained to be executed manually in the embodiments may be executed automatically using known methods. Furthermore, processing or controlling procedures, specific names, and information including various types of data and parameters mentioned herein or in the drawings may be changed in any way unless specified otherwise.

The components of each device illustrated in the drawings are functionally conceptual and are not necessarily physically configured as illustrated. In other words, the specific aspects of distribution and integration of each device are not limited to those illustrated in the drawings. All or a part of the components may be distributed or integrated functionally or physically in desired units depending on various types of loads and usage, for example. Furthermore, all or a desired part of the processing functions carried out by each device can be provided by a CPU and a computer program analyzed and executed by the CPU or as wired logic hardware.

Hardware

An example of a hardware configuration of each of the servers will now be explained. Because all of the servers have the same hardware configuration, these servers will be explained as a server 100.

Figure 22:
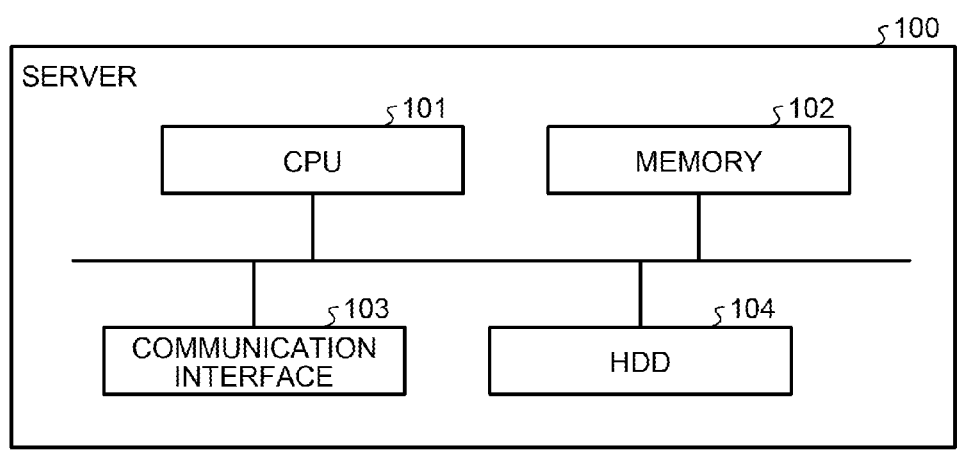
FIG. 22 is a schematic for explaining an example of a hardware configuration.

FIG. 22 is a schematic for explaining an example of the hardware configuration. As illustrated in FIG. 22, the server 100 includes a CPU 101, a memory 102, a communication interface 103, and a hard disk drive (HDD) 104. These devices illustrated in FIG. 22 are connected to each other via a bus, for example.

An example of the communication interface 103 is a network interface card. The HDD 104 stores therein computer programs causing the functions, tables, and the like illustrated in FIGS. 3 to 7 to operate.

The CPU 101 causes a process executing the functions explained with reference to FIGS. 3, 5, and 7 to operate by reading a computer program executing the processes that are the same as those of the processing units illustrated in FIGS. 3, 5, and 7 from the HDD 104, for example, and loading the computer program onto the memory 102.

To explain with an example, this process executes the same functions as those of the processing units included in the call control server 20. Specifically, the CPU 101 reads a computer program having the same functions as those provided by the respective processing units included in the software controller 21 and the U-PLANE controller 25 from the HDD 104, for example. The CPU 101 then executes the process handling the same processes as those handled by the software controller 21 and the U-PLANE controller 25.

In this manner, the server 100 operates as an information processing apparatus that executes the communication method by reading and executing a computer program. The server 100 may implement the same functions as those described above by reading the computer program from a recording medium using a medium reader, and executing the read computer program. The computer program according to this other embodiment is not limited to a computer program executed by the server 100. For example, the present invention may be implemented in the same way when another computer or server executes the computer program, or another computer and server execute the computer program cooperatively.

According to the embodiment, transmission line resources can be used efficiently.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a first call control server;
    a second call control server, and
    a load balancing server that distributes call control requests to each of call control servers,
    the first call control server comprising:
        a transmitting unit that transmits station data which is stored as an objective of call control by the first call control server to the second call control server when congestion is detected, the station data including called telephone information which identifies a destination terminal device of the call control and line information related to a communication line to be used by the destination terminal device; and
        a connecting unit that receives a result of C-PLANE control which specifies called information which is used to call connection from the second call control server, and establishes, by executing U-PLANE control which establishes the call connection using the result of C-PLANE control, the call connection with the destination terminal device,
    the second call control server comprising:
        a first receiving unit that receives the station data from the first call control server;
        a second receiving unit that receives a call control request for the destination terminal device, the call control request being addressed to the first call control server; and
        a responding unit that executes the C-PLANE control based on the received station data when the second receiving unit receives the call control request, and responds the first call control server with the result of the C-PLANE control, and
    the load balancing server comprising:
        a predicting unit that predicts a change in load based on load information from each of the call control servers; and
        an instruction transmitting unit that transmits an instruction the first call control server, the instruction for transmitting the station data to the second call control server, when the predicting unit predicts that the load on the first call control server is to exceed a threshold in a predetermined time period.

2. The communication system according to claim 1, wherein
    the load balancing server further comprises a load balancing unit that distributes call control requests for the terminal device at a ratio which smooths loads of each of a plurality of second call control servers, based on changes in the loads predicted by the predicting unit.

3. The communication system according to claim 1, wherein
    the load balancing server further comprises a notifying unit that, when a relief of the congestion is detected based on load information of the first call control server, notifies the first call control server of relief of the congestion after a predetermined time period elapses from the relief of the congestion is detected, and
    the transmitting unit in the first call control server requests the second call control server to delete the station data when the notification of the relief of the congestion is received from the load balancing server, and
    the responding unit in the second call control server deletes the station data when the request for deleting the station data is received from the first call control server.

4. The communication system according to claim 3, wherein the notifying unit in the load balancing server changes the ratio at which the call control requests for the terminal device are distributed to the first call control server and the second call control server, when the relief of the congestion is detected, at a specified cycle until the predetermined time period elapses.

5. A communication method comprising:
    using a first call control server, transmitting station data which is stored as an objective of call control by the first call control server to a second call control server when congestion is detected, the station data including called telephone information which identifies a destination terminal device of the call control and line information related to a communication line to be used by the destination terminal device, and
    using the first call control server, receiving a result of C-PLANE control which specifies called information which is used to call connection from the second call control server, and establishing, by executing U-PLANE control which establishes the call connection using the result of C-PLANE control, the call connection with the destination terminal device; and
    using the second call control server, receiving the station data from the first call control server,
    using the second call control server, receiving a call control request for the destination terminal device, the call control request being addressed to the first call control server,
    using the second call control server, executing the C-PLANE control based on the received station data when the call control request is received, and
    using the second call control server, responding the first call control server with the result of the C-PLANE control, and
    using a load balancing server that distributes call control requests to each of call control servers, predicting a change in load based on load information from each of the call control servers, and using the load balancing server, transmitting an instruction the first call control server, the instruction for transmitting the station data to the second call control server, when the load on the first call control server is predicted to exceed a threshold in a predetermined time period.

\* \* \* \* \*